United States Patent
Agrawal et al.

(10) Patent No.: US 12,472,473 B2
(45) Date of Patent: Nov. 18, 2025

(54) PROCESS FOR GRAPHENE MEMBRANES LATTICE ENGINEERING AND USES THEREOF

(71) Applicant: GAZNAT SA, Lausanne (CH)

(72) Inventors: Kumar Varoon Agrawal, Vevey (CH); Shiqi Huang, Manchester (GB); Kuang-Jung Hsu, Sion (CH)

(73) Assignee: GAZNAT SA, Lausanne (CH)

( * ) Notice: Subject to any disclaimer, the term of this patent is extended or adjusted under 35 U.S.C. 154(b) by 459 days.

(21) Appl. No.: 17/915,143

(22) PCT Filed: Mar. 29, 2021

(86) PCT No.: PCT/EP2021/058215
§ 371 (c)(1),
(2) Date: Sep. 28, 2022

(87) PCT Pub. No.: WO2021/198210
PCT Pub. Date: Oct. 7, 2021

(65) Prior Publication Data
US 2023/0149861 A1    May 18, 2023

(30) Foreign Application Priority Data
Mar. 30, 2020   (EP) .................... 20166877

(51) Int. Cl.
*B01D 71/02* (2006.01)
*B01D 53/22* (2006.01)
(Continued)

(52) U.S. Cl.
CPC ........ *B01D 71/0211* (2022.08); *B01D 53/228* (2013.01); *B01D 67/0062* (2013.01); *B01D 69/108* (2022.08); *B01D 2257/504* (2013.01)

(58) Field of Classification Search
None
See application file for complete search history.

(56) References Cited

U.S. PATENT DOCUMENTS

2021/0023508 A1   1/2021   Agrawal et al.

FOREIGN PATENT DOCUMENTS

| | | |
|---|---|---|
| EP | 3 539 644 | 9/2019 |
| JP | 2014-238377 | 12/2014 |
| WO | WO 2019/175162 | 9/2019 |

OTHER PUBLICATIONS

Zhao, J. et al., "Etching gas-sieving nanopores in single-layer graphene with an angstrom precision for high-performance gas mixture separation", Science Advances, Jan. 2019, 5, pp. 1-9. (Year: 2019).*

(Continued)

*Primary Examiner* — Duane Smith
(74) *Attorney, Agent, or Firm* — SALIWANCHIK, LLOYD & EISENSCHENK

(57) ABSTRACT

The invention relates to a millisecond gasification method to fabricate graphene membranes, yielding a molecular sieving resolution of 0.2 Å for selective gas separation, and further relates to a method of preparation and uses thereof. In particular, the invention relates to the graphene membranes that have large $CO_2$ permeances combined with attractive $CO_2/N_2$ and $CO_2/CH_4$ selectivity.

13 Claims, 19 Drawing Sheets

(51) Int. Cl.
  *B01D 67/00* (2006.01)
  *B01D 69/10* (2006.01)

(56) References Cited

OTHER PUBLICATIONS

Bae, S. et al. "Roll-to-roll production of 30-inch graphene films for transparent electrodes" *Nature Nanotechnology*, Jun. 20, 2010, pp. 574-578, vol. 5.

Celebi, K. et al. "Ultimate Permeation Across Atomically Thin Porous Graphene" *Science*, Apr. 18, 2014, pp. 289-292, vol. 344, No. 6181.

Chu, X. et al. "Reactions of NO, $O_2$, $H_2O$, $CO_2$ with the basal plane of graphite" *Surface Science*, 1992, pp. 325-332, vol. 268.

Eum, K. et al. "ZIF-8 Membrane Separation Performance Tuning by Vapor Phase Ligand Treatment" *Agnewandt Chemie*, 2019, pp. 16542-16546, vol. 131.

Girit, C. O. et al. "Graphene at the Edge: Stability and Dynamics" *Science*, Mar. 27, 2009, pp. 1705-1708, vol. 323, No. 5922.

Gong, C. et al. "Rapid Selective Etching of PMMA Residues from Transferred Graphene by Carbon Dioxide" *The Journal of Physical Chemistry*, Oct. 10, 2013, pp. 23000-23008, vol. 117.

He, G. et al. "High-permeance polymer-functionalized single-layer graphene membranes that surpass the postcombustion carbon capture target" *Energy Environ. Sci.*, 2019, pp. 3305-3312 (including cover page), vol. 12.

Huang, S. et al. "Single-layer graphene membranes by crack-free transfer for gas mixture separation" *Nature Communications*, Jul. 6, 2018, pp. 1-11, vol. 9, No. 2632.

Huang, S. et al. "Ultrathin Carbon Molecular Sieve Films and Room-Temperature Oxygen Functionalization for Gas-Sieving" *ACS Applied Materials & Interfaces*, Apr. 16, 2019, pp. 16729-16736, vol. 11, No. 18.

Jiang, D. et al. "Porous Graphene as the Ultimate Membrane for Gas Separation" *Nano Letters*, 2009, pp. 4019-4024, vol. 9, No. 12.

Koenig, S. P. et al. "Selective molecular sieving through porous graphene" *Nature Nanotechnology*, Nov. 2012, pp. 728-732, vol. 7.

Li, H. et al. "Ultrathin, Molecular-Sieving Graphene Oxide Membranes for Selective Hydrogen Separation" *Science*, Oct. 4, 2013, pp. 95-98, vol. 342, No. 6154.

Li, J.-L. et al. "Oxygen-Driven Unzipping of Graphitic Materials" *Physical Review Letters*, May 2, 2006, pp. 176101-1-176101-4, vol. 96, No. 17.

Li, X. et al. "Large-Area Synthesis of High-Quality and Uniform Graphene Films on Copper Foils" *Science*, Jun. 5, 2009, pp. 1312-1314, vol. 324, No. 5932.

Liu, H. et al. "Selectivity trend of gas separation through nanoporous graphene" *Journal of Solid State Chemistry*, availabile online Jan. 29, 2014, pp. 2-6, vol. 224.

Lozada-Hidalgo, M. et al. "Sieving hydrogen isotopes through two-dimensional crystals" *Science*, Jan. 1, 2016, pp. 68-70, vol. 351, Issue 6268.

Ma, X. et al. "Zeolitic imidazolate framework membranes made by ligand-induced permselectivation" *Science*, Sep. 7, 2018, pp. 1-4, vol. 361.

Merkel, T. C. et al. "Power plant post-combustion carbon dioxide capture: An opportunity for membranes" *Journal of Membrane Science*, available online Nov. 4, 2009, pp. 126-139, vol. 359.

Roussanaly, S. et al. "Membrane properties required for post-combustion $CO_2$ capture at coal-fired power plants" *Journal of Membrane Science*, available online Mar. 24, 2016, pp. 250-264, vol. 511.

Sholl, D. S. et al. "Seven chemical separations to change the world" *Nature*, Apr. 28, 2016, pp. 435-437, vol. 532.

Strudwick, A. J. et al. "Chemical Vapor Deposition of High Quality Graphene Films from Carbon Dioxide Atmospheres" *ACS Nano*, published online Nov. 14, 2014, pp. 31-42, vol. 9, No. 1.

Suarez, A. M. et al. "Gate-Voltage Control of Oxygen Diffusion on Graphene" *Physical Review Letters*, Apr. 5, 2011, pp. 146802-1-146802-4, vol. 106, No. 14.

Tracz, A. et al. "Scanning Tunneling Microscopy Study of Graphite Oxidation in Ozone-Air Mixtures" *Langmuir*, 2003, pp. 6807-6812, No. 19, No. 17.

Vallejos-Burgos, F. et al. "Air separation with graphene mediated by nanowindow-rim concerted motion" *Nature Communications*, 2018, pp. 1-9, vol. 9, No. 1812.

Wang, L. et al. "Fundamental transport mechanisms, fabrication and potential applications of nanoporous atomically thin membranes" *Nature Nanotechnology*, Jun. 6, 2017, pp. 509-522, vol. 12.

Yang, R. T. et al. "Kinetics and mechanism of oxidation of basal plane on graphie" *J. Chem. Phys.*, Nov. 1, 1981, pp. 4471-4476, vol. 75, No. 9.

Yuan, Z. et al. "Mechanism and Prediction of Gas Permeation through Sub-Nanometer Graphene Pores: Comparison of Theory and Simulation" *ACS Nano*, Jul. 11, 2017, pp. A-N.

Zhang, F. et al. "Isomer-Pure Bis-PCBM-Assisted Crystal Engineering of Perovskite Solar Cells Showing Excellent Efficiency and Stability" *Advanced Materials*, 2017, pp. 1-7, vol. 29, No. 1606806.

Zhao, J. et al. "Etching gas-sieving nanopores in single-layer graphene with an angstrom precision for high-performance gas mixture separation" *Science Advances*, Jan. 25, 2019, pp. 1-9, vol. 5, No. 1.

Zhu, T. et al. "Highly mobile charge-transfer excitons in two-dimensional $WS_2$/tetracene heterostructures" *Science Advances*, Jan. 12, 2018, pp. 1-8, vol. 4, No. 1.

Written Opinion in International Application No. PCT/EP2021/058215, Jul. 6, 2021, pp. 1-10.

Huang, S. et al. "Millisecond lattice gasification for high-density $CO_2$- and $O_2$-sieving nanopores in single-layer graphene" *Science Advances*, Feb. 24, 2021, pp. 1-12, vol. 7, No. 9.

Huang, S. et al. "Systematic design of millisecond gasification reactor for the incorporation of gas-sieving nanopores in single-layer graphene" *Journal of Membrane Science*, Jul. 2021, pp. 1-10, vol. 637, 119628.

Hsu, K-J. et al. "Multipulsed Millisecond Ozone Gasification for Predictable Tuning of Nucleation and Nucleation-Decoupled Nanopore Expansion in Graphene for Carbon Capture" *ACS Nano*, Jul. 28, 2021, pp. 13230-13239, vol. 15, No. 8.

Huang, S. et al. "In Situ Nucleation-Decoupled and Site-Specific Incorporation of Å-Scale Pores in Graphene Via Epoxidation" *Advanced Materials*, 2022, pp. 1-10, vol. 34, No. 51, 2206627.

Bondaz, L. et al. "Selective Photonic Gasification of Strained Oxygen Clusters on Graphene for Tuning Pore Size in the Å Regime" *JACS Au*, 2023, pp. 2844-2854, vol. 3, No. 10.

Hsu, K-J. et al. "Graphene membranes with pyridinic nitrogen at pore edges for high-performance $CO_2$ capture" *Nature Energy*, published online Jun. 11, 2024, pp. 1-11, vol. 9.

Hao, J. et al. "Scalable synthesis of $CO_2$-selective porous single-layer graphene membranes" *ChemRxiv*, pp. 1-22, 2025, doi: 10.26434/chemrxiv-2025-z8g2d.

* cited by examiner

B

C

A

B

C

Missing Carbon Atoms 1-6

Missing Carbon Atoms 7-12

Missing Carbon Atoms 13-22

PROCESS FOR GRAPHENE MEMBRANES LATTICE ENGINEERING AND USES THEREOF

CROSS-REFERENCE TO RELATED APPLICATION

This application is the U.S. national stage application of International Patent Application No. PCT/EP2021/058215, filed Mar. 29, 2021.

FIELD OF THE INVENTION

The present invention pertains generally to the field of gas selective separation filters, in particular useful for gas mixture separation, notably in the context of carbon capture resulting from the separation of $CO_2$ from $H_2$ and $N_2$ and hydrocarbons, for instance from gas waste or effluents. The invention more specifically relates to filters using atom-thick graphene porous membranes.

BACKGROUND OF THE INVENTION

In the frame of addressing the global warming issues and identified contributing factors, one option that has been developed is the reduction of greenhouse gas emissions by the capture of carbon dioxide from gaseous streams followed by underground sequestration. Carbon capture and storage is a strategy for mitigating $CO_2$ emissions from large point sources, such as coal-fired power plants. However, molecular separation, a key component of industrial processes and at the heart of environmental issues like carbon capture, is highly energy-intensive (Sholl et al., 2016, *Nature.* 532, 435-437). The energy-efficiency and capital cost of the separation processes can be substantially reduced by using high-performance molecular-sieving membranes separating gases based on their kinetic diameter (Ma et al., 2018, *Science*, 361, 1008-1011; Zhou et al., 2018, *Sci. Adv.*, 4, 19; Zhang et al., 2017, *Adv. Mater.*, 29, 1-6; Lozada-Hidalgo et al., 2016, *Science*, 351, 68-70). Specifically, significant improvement in energy-efficiency of separation processes such as post-combustion carbon capture can be achieved by increasing the $CO_2$ permeance (Merkel et al., 2010, *J. Memb. Sci.*, 359, 126-139; Roussanaly et al., 2016, *J. Memb. Sci.*, 511, 250-264).

Gas-sieving nanoporous single-layer graphene (N-SLG), prepared by incorporating vacancy defects in the single-layer graphene (SLG) lattice, is highly promising for high flux gas separation because the diffusion resistance is controlled by a single transition state at the nanopore (Jiang et al., 2009, *Nano Lett.*, 9, 4019-24; Celebi et al., 2014, *Science*, 344, 289-292; Song et al., 2013, *Science*, 342, 95-98). However, with state-of-the-art etching techniques (Wang et al., 2017, *Nat. Nanotechnol.*, 12, 509-522), it is difficult to incorporate vacancy defects that can sieve similarly-sized molecules, mainly because nucleation and growth of vacancy defects is not controlled to the extent needed for the incorporation of narrow pore-size-distribution.

Molecular sieving resolution (MSR), defined as the difference in the kinetic diameters of molecules to be separated, of 0.2 Å has been predicted from the vacancy-incorporated lattice, allowing the separation of industrially-relevant mixtures such as $CO_2/N_2$ (Liu et al., 2015, *J. Solid State Chem.*, 224, 2-6), $CO_2/CH_4$ (Yuan et al., 2017, *ACS Nano.*, 11, 7974-7987), $O_2/N_2$ (Vallejos-burgos et al., 2018, *Nat. Commun.*, 1-9) etc. However, controlled etching of SLG to incorporate vacancy defects that can sieve similarly-sized gas molecules ($CO_2/N_2$, $CO_2/O_2$, $O_2/N_2$) has remained elusive because of the difficulty in controlling the nucleation and growth of vacancy defects in graphene with a sub-angstrom resolution (Koenig et al., 2012, *Nat. Nanotechnol.*, 7, 728-32; Wang et al., 2017, *Nat. Nanotechnol.*, 12, 509-522; Zhao et al., 2019, *Sci. Adv.* 5, eaav1851). This is because the removal of carbon atoms from the pristine lattice proceeds at a much slower rate than that at the nanopore edge (Chu et al., 1992, *Surf. Sci.*, 268, 325-332) and controlled expansion of the vacancy defects remains a bottleneck. Commercial membranes (Polaris™), based on polymeric thin film composites, have generally a $CO_2$ permeance of about 1'000 GPU (1 GPU=$3.35 \times 10^{-10}$ mol m$^{-2}$ s$^{-1}$ Pa$^{-1}$) and a $CO_2/N_2$ selectivity of about 50 (Merkel et al., 2010, *J. Memb. Sci.*, 359, 126-139).

Therefore, the development of new methods of fabricating graphene membranes that possess size-selective pores with a narrow pore-size-distribution is highly attractive in view of the large-scale deployment of the nanoporous two-dimensional membranes that has been hampered so far by the above described technical limitations.

SUMMARY OF THE INVENTION

A general object of this invention is to provide an efficient gas selective filter using a graphene membrane for gas separation (e.g. $H_2/CO_2$, $CO_2/N_2$ and $CO_2/CH_4$ separation).

One of the specific objects of this invention is to provide an efficient gas selective filter for $CO_2$ capture.

It is advantageous to provide a gas selective filter, having a molecular sieving resolution of about 0.2 Å.

It is advantageous to provide a gas selective filter, having large $O_2$ and $CO_2$ permeances, in particular exceeding 1'000 GPU, combined with attractive gas selectivities (e.g. $H_2/CO_2$, $CO_2/N_2$ and $CO_2/CH_4$, $O_2/N_2$).

It is advantageous to provide a gas selective filter, having a $CO_2/N_2$ selectivity from about 10 to about 50.

It is advantageous to provide a gas selective filter, having a low density of intrinsic vacancy defects even for large area filter surface.

An object of this invention is to provide a gas selective filter comprising a graphene membrane, and a method for the preparation of a gas selective filter comprising a graphene membrane, which is cost effective, has good gas selectivity, which allows the fine adjustment of the molecular sieving resolution (e.g. 0.1 Å) and has high performance.

It is advantageous to provide method for the preparation of a gas selective filter comprising a graphene membrane which allows achieving the combination of increasing membrane pore density and narrowing the pore-size distribution (PSD).

It is advantageous to provide method for the preparation of a gas selective filter comprising a graphene membrane which allows achieving the combination of increasing $CO_2$-sieving performance and narrowing the pore-size distribution (PSD).

It is advantageous to provide a gas selective filter, which is stable for operation in temperature range of 0-200° C., in presence of moisture, and in presence of high pressure.

Objects of this invention have been achieved by providing a gas selective separation filter and uses thereof and a method for the preparation of a gas selective separation filter.

Disclosed herein is a method for the preparation of a gas selective separation filter comprising the steps of:

a) providing a graphene membrane on a sacrificial support layer;
b) subjecting said graphene membrane to one or more transient pressurized ozone gas pulses at a reactor temperature comprised between about 120 to 300° C.;
c) purging ozone from the reactor chamber during or right after the transient pressurized ozone gas pulse;
d) cooling down the ozone treated graphene membrane to room temperature.

Each transient ozone gas pulse lasts for about 0.01 to about 0.3 second.

Also disclosed herein is a gas selective filter comprising a graphene membrane having a thickness of about 0.34 nm (single-layer graphene) and a sieving resolution of about 0.2 Å.

Also, disclosed herein is a use of a gas selective filter comprising a graphene membrane according to the invention, for gas separation, in particular for separating $H_2$, $N_2$ and/or $CH_4$ from $CO_2$.

In an advantageous embodiment, the $O_2$ permeance of the graphene membrane is from about 100 ($3.4 \times 10^{-8}$ mol m$^{-2}$s$^{-1}$ Pa$^{-1}$) to about 1'300 GPU (e.g., 1'300 GPU) ($4.4 \times 10^{-7}$ mol m$^{-2}$s$^{-1}$ Pa$^{-1}$).

According to a particular aspect, the gas selective filters according to the invention have a $CO_2$ permeance from about 850 to about 26'000 GPU, preferably from 1'000 to about 26'000 GPU.

According to another particular aspect, the gas selective filters according to the invention have a $CO_2$ permeance from about 850 ($2.8 \times 10^{-7}$ mol m$^{-2}$s$^{-1}$ Pa$^{-1}$) a) to about 11'850 GPU ($4.0 \times 10^{-7}$ mol m$^{-2}$s$^{-1}$ Pa$^{-1}$), a), preferably from 1'000 to about 15'000 GPU more particular from about 3'500 to about 15'000 GPU (e.g., 11'850 GPU).

According to another particular aspect, the gas selective filters according to the invention have a $CO_2$ permeance from about 3'000 to about 26'000 GPU, in particular from about 3'170 to about 25'530 GPU.

Other features and advantages of the invention will be apparent from the claims, detailed description, and figures.

DETAILED DESCRIPTION OF EMBODIMENTS OF THE INVENTION

The expression "graphene membrane" is a graphene layer, in particular a graphene monolayer such as obtained for example by CVD. For example, a single-layer graphene membrane has a thickness in a range of about 0.34 to 1 nm. The graphene membrane according to embodiments of the invention may however also include bilayer graphene, or portions with bilayer graphene, it being understood that achieving a highly homogeneous monolayer over the surface area of the membrane may not be efficient for an industrial scale manufacturing of the membrane.

The expression "sacrificial support layer" is a suitable support (e.g. a Cu, Ni, Pt or any other metallic substrate on which single-layer graphene can be synthesized), in particular a non-porous support, for a graphene membrane that can be sacrificed before or after the graphene membrane is applied to a structural (mechanical) support.

The expression "membrane performance" refers to the combination of the membrane gas permeance and its gas selectivity. Typically, in the field of gas separation, $CO_2$ permeance of 1'000 GPU and $CO_2/N_2$ selectivities of 20 or higher is considered as a good membrane performance. Further, $O_2$ permeance of 35 GPU and $O_2/N_2$ selectivities of 3 or higher (Kiwon, et al., 2019, *Angew. Chem. Int. Ed.*, 131, 16542-16546) is considered as a good membrane performance.

Figure 1:
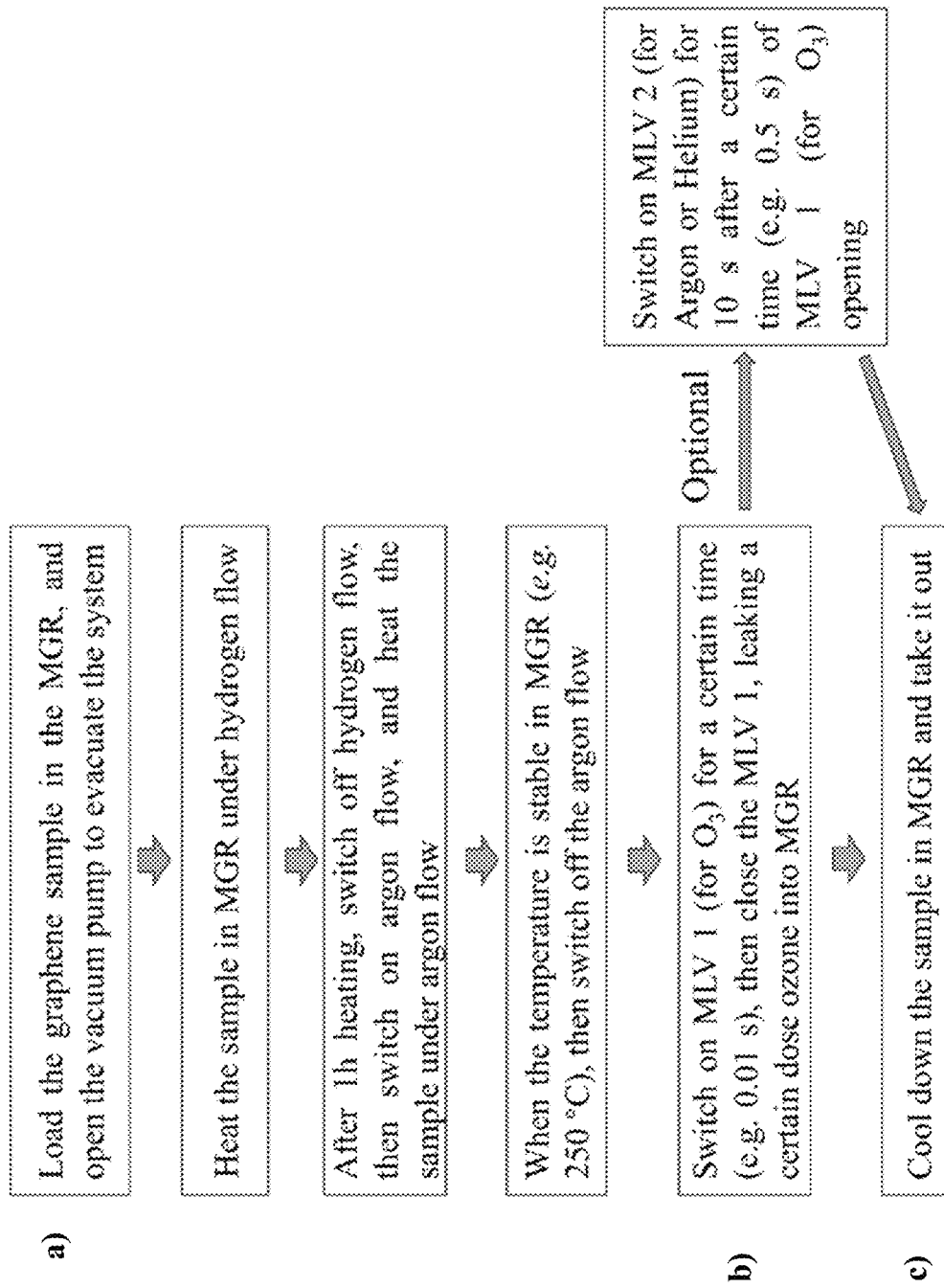
FIG. 1 is an illustrative workflow of the main steps of a method according to the invention as performed under Example 1.

Referring to the figures, in particular first to FIG. 1, is provided an illustration of a method for the preparation of a gas selective filter.

More specifically, the steps of the embodiment illustrated in FIG. 1 comprise:
 a) providing a graphene membrane on a sacrificial support layer;
 b) subjecting said graphene membrane to one or more transient ozone gas pulses at a reactor temperature comprised between about 120 to 300° C.;
 c) purging ozone from the reactor chamber during or right after the transient pressurized ozone gas pulse;
 d) cooling down the ozone treated graphene membrane to room temperature.

Each transient ozone gas pulse is provided into the reactor chamber at a pressure of about 3 to about 28 Torr from an ozone source. Since $O_3$ is not delivered in the form of a pure gas but as a mixture of $O_2$ and $O_3$, these values correspond to the $O_3$ partial pressure. Therefore, depending on the content in ozone present in the ozone source, the total pressure to be applied to the reactor will need to be adapted to reach an ozone gas partial pressure of 3 to about 28 Torr in the reactor.

According to a particular embodiment, the graphene membrane is provided in a heated reactor chamber under an inert gas atmosphere.

According to a further particular embodiment, the reactor chamber is heated under $H_2$ pressure.

According to a particular embodiment, the reactor chamber is heated under $H_2$ pressure and then the inert gas is switched to Argon and the temperature of the reactor chamber is stabilized to the reactor temperature.

According to a further particular embodiment, the Argon flow is switched off when the temperature of the reactor chamber is stabilized to the reactor temperature.

According to a particular embodiment, the transient ozone gas pulse is provided into the reactor chamber at a pressure of about 3 to about 27 Torr from an ozone source. According to another particular embodiment, the reactor chamber at a pressure of about 5 to about 28 Torr from an ozone source.

According to another particular embodiment, the ozone source is connected to the reactor chamber through a millisecond leak valve.

According to another particular embodiment, the transient ozone gas pulse is subjected to the graphene membrane such that the graphene etching time is kept well below 1 s.

According to another particular embodiment, the transient ozone gas pulse lasts for about 0.01 to about 0.2 seconds.

According to another particular embodiment, each transient ozone gas pulse lasts 100 ms or less for example from about 10 ms to about 100 ms.

According to another particular embodiment, the plurality of transient ozone gas pulses comprises about 10 to 20 pulses of 100 ms or less, e.g. about 15 pulses of 100 ms or less for example from about 10 ms to about 100 ms.

According to another further particular embodiment, the pulses of said plurality of pulses are generated sequentially spaced in time at an interval from about 100 ms to about 500 ms between pulses.

According to another particular embodiment, the transient ozone gas pulse contains a $O_3$ dose of about $3.2 \times 10^{16}$ to about $3.5 \times 10^{17}$ molecules $cm^{-3}$ s, such as about $1.6 \times 10^{17}$ molecules $cm^{-3}$ s.

According to another particular embodiment, ozone is purged from the reactor chamber during the transient ozone gas pulse, or immediately after or with a short delay after the last transient ozone gas pulse. The short delay is preferably less than 10s, preferably less than 1s, more preferably within a range of 0 to 800 ms, for instance about 500 ms.

According to another particular embodiment, ozone is immediately purged from the reactor chamber immediately after the last transient ozone gas pulse.

According to another particular embodiment, ozone is purged from the reactor chamber through a vacuum purge system.

According to another particular embodiment, ozone is purged from the reactor chamber by an inert gas purge flow connected to the vacuum purge system after the last transient ozone gas pulse.

According to another particular embodiment, the inert gas purge lasts for from about 1 to 10 seconds.

According to another particular embodiment, the inert gas purge is pressurized Ar or He purge.

According to another particular embodiment, the ozone source comprises a buffer reservoir tank containing a mixture of $O_2$ and $O_3$ at a pressure of about 1 and 5 bars.

According to another particular embodiment, the buffer reservoir tank contains a mixture of $O_2$ and $O_3$, wherein the $O_3$ molar content is about 9%.

According to another particular embodiment, the buffer reservoir tank is filled with a continuous flow of mixture of $O_2$ and $O_3$ provided by an ozone generator.

According to another particular embodiment, the continuous flow of mixture of $O_2$ and $O_3$ provided by an ozone generator into the buffer reservoir tank is of about 100 sccm to about 200 sccm for example about 100 sccm.

According to another particular embodiment, the reactor temperature is from about 150 to about 300° C.

According to another particular embodiment, the reactor temperature is from about 120 to about 290° C.

According to another particular embodiment, the reactor temperature is from about 150 to about 290° C.

According to another particular embodiment, the ozone treated graphene membrane is cooled down within the reactor chamber under intert atmosphere.

According to another further particular embodiment, the ozone treated graphene membrane is cooled down within the reactor chamber under Ar atmosphere.

According to another particular embodiment, when the sacrificial support is copper, the cooled down ozone treated graphene membrane is then subjected to an annealing temperature treatment under intert atmosphere to reduce the copper.

According to another particular embodiment, when the sacrificial support is copper, the cooled down ozone treated graphene membrane is then subjected to an annealing temperature treatment at a temperature about 300° C. under reduced atmosphere (e.g. $H_2$) to reduce the copper.

According to further particular embodiment, the ozone treated graphene membrane can be subjected to an additional treatment to slightly increase the mean pore size and therefore the molecular cutoff, said additional treatment comprising a further step of subjecting the ozone treated graphene membrane after cooling at room temperature to a $O_2$ atmosphere (e.g. from about pressure range of 1-10 bar) at a temperature of about 150-300° C. (e.g. about 200° C.) for about 0.1 to about 2 h. In this case, $CO_2$ and $O_2$ permeance as well as $CO_2/N_2$ and $O_2/N_2$ selectivities were further increased.

According to another particular embodiment, the ozone treated graphene membrane can be assembled into a gas filter module after removal of the sacrificial support layer and provision of a reinforcement support by known techniques such as for example described in our previous report (Huang, et al., *Nat. Commun.*, 2018, 9, 2632) and WO 2019/175162.

Figure 2A:
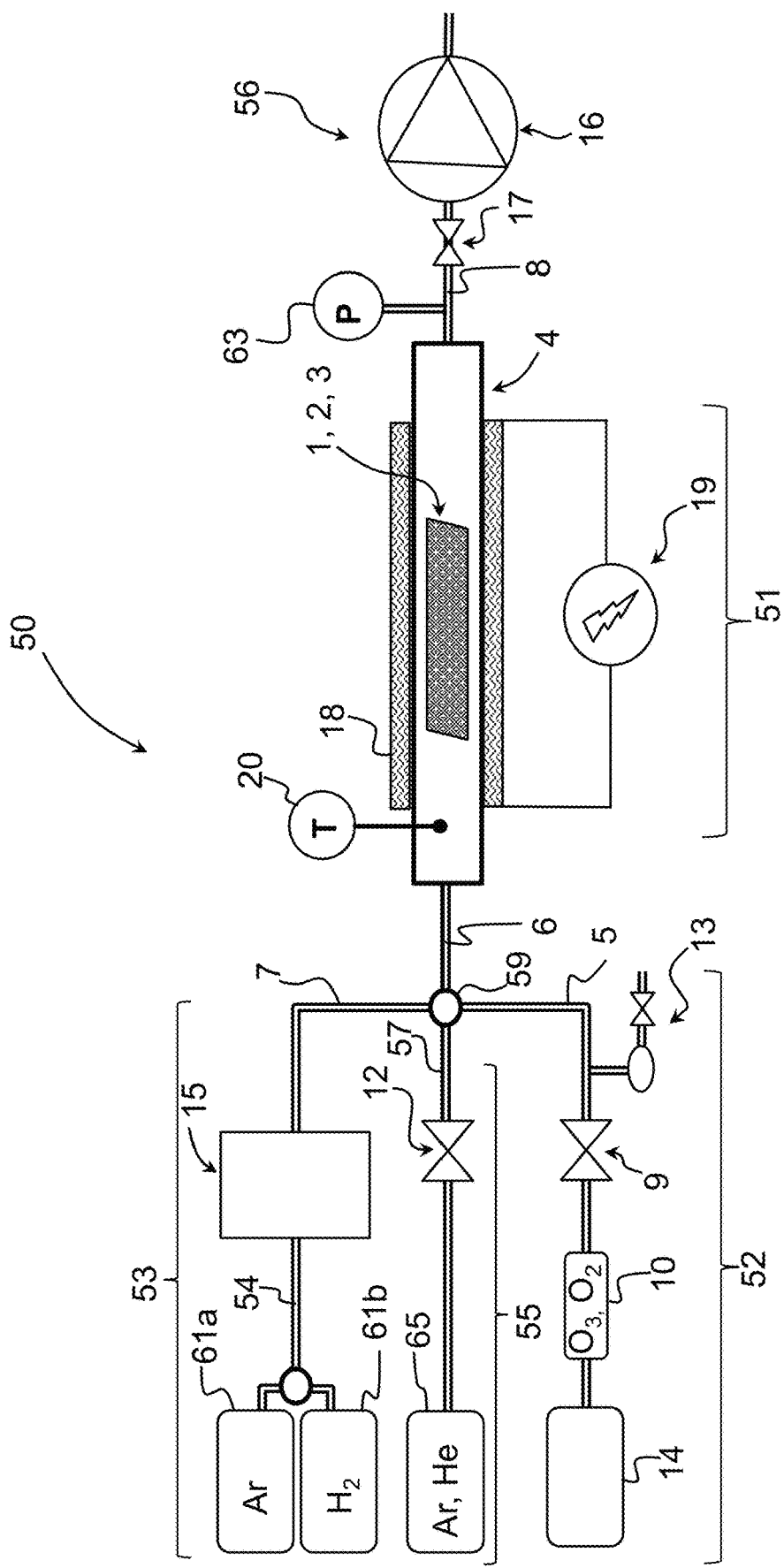
FIG. 2 provides a schematic illustration of the reactor set-ups for performing a method according to the invention (A) and the corresponding $O_3$ pulse profiles obtained in different conditions of the method (B to E). B: Profile of the $O_3$ pulse provided to a single graphene in a millisecond gasification reactor (MGR); C: Schematic representation of $O_3$ supply to the reactor chamber of via a millisecond gasification reactor via a millisecond leak valve (MLV) D: Total pressure ($O_2/O_3$) profile in the reactor chamber when operated using r (opening time of MLV-1) of 0.1 s and $P_{up}$ of 3 bar based both on experimental data (dots) and the modelled pressure (line) where the ozone source contains 9 mol % in $O_3$ generated by an ozone generator as detailed in Example 1; E: Experimental chamber pressure profile obtained by using τ of 0.1 s, $P_{up}$ of 3 bar, and $t_d$ (delay time of Ar) of 0.5 s.

Referring to the figures, in particular first to FIG. 2A, is provided an illustration of a set-up for the preparation of a gas selective filter according to a method of the invention as a millisecond gasification system.

More specifically, a millisecond gasification system 50 according to an embodiment of the invention includes a reactor chamber 4 comprising an inlet 6 and an outlet 8, a reactor chamber atmosphere controlling system 53 coupled fluidly to the reactor chamber inlet 6, a purge system 55 coupled fluidly to the reactor chamber inlet 6, a pressurized ozone delivery system 52 coupled fluidly to the reactor chamber inlet 6, and a vacuum system 56 coupled fluidly to the reactor chamber outlet 8.

The millisecond gasification system 50 further comprises a reactor chamber heating system 51 configured to heat and control the temperature inside the reactor chamber 4.

The ozone delivery system 52, a reactor chamber atmosphere controlling system 53, and purge system 55 may be connected fluidly to the reactor chamber 4 individually via separate inlets (not shown), or as illustrated, may be connected via a multi-entry port connector or valve 59 to a single reactor chamber inlet 6.

The ozone delivery system 52 comprises an ozone source that may comprise an ozone generator 14 and optionally a buffer reservoir tank 10 fluidly connected downstream to the ozone generator, and a millisecond leak valve 9 (MLV-1) arranged between the ozone source and the reactor chamber inlet 6. The ozone delivery system 52 may further comprise a pressure regulator 13 arranged between the millisecond leak valve 9 and the reactor chamber inlet 6 configured to regulate, in particular set a maximum pressure threshold for the ozone supplied to the reactor chamber. The millisecond leak valve 9 (MLV-1) may be actuated to deliver a transient ozone gas pulse into the reactor chamber 4. The pressurized ozone source and millisecond leak valve 9 are thus operable to deliver a transient ozone gas pulse in the reactor chamber 4.

According to a particular embodiment, the buffer reservoir tank 10 may contain a mixture of $O_2$ and $O_3$ generated by ozone generator 14 at a pressure of about between 1 and 10 bars (e.g. about 5 to about 10 bars) with pressure regulator 13.

The a purge system 55 comprises a purge gas source 65 that may comprise a pressurized reservoir tank filled preferably with an inert gas such as Argon or Helium, and a millisecond leak valve 12 (MLV-2) arranged between the purge gas source and the reactor chamber inlet 6. The purge system millisecond leak valve 12 (MLV-2) may be actuated to rapidly deliver the purge gas into the reactor chamber 4, thus rapidly purging the ozone gas out from the reactor chamber 4 through the reactor chamber outlet 8 during or right after the transient pressurized ozone gas pulse.

The purge system 55 preferably comprises a vacuum generation system 56 comprising a vacuum pump 16 and a vacuum control valve 17, said vacuum control valve being in fluid communication with the reactor chamber 4 through the reactor gas outlet 8 to evacuate the ozone gas from the reactor chamber 4 during or right after the transient pressurized ozone gas pulse. The vacuum pump 16 may thus remain in pumping operation prior to ozone pulse treatment and the subsequent inert gas purge, the control of the vacuum pressure in the reactor chamber being effected by the opening and closing of the vacuum control valve 17. The system may further comprise a pressure transducer 63 to monitor the pressure inside the reaction chamber 4.

According to an embodiment, the millisecond leak valve 12 may be actuated shortly after (e.g. delay of 0 to 1 s) the end of actuation of millisecond leak valve 9 to deliver pressurized purge gas into the reactor chamber 4 through the multi-entry port valve 59.

According to a particular embodiment, the reactor chamber atmosphere controlling system 53 comprises a gas line 54 fluidly connected to one or more atmosphere control gas sources 61a, 61b, and a gas flow controller 15 to control the delivery and optionally the composition (mixture) of the control gas into the reactor chamber 4 prior to ozone treatment and subsequent to ozone treatment.

The control gas injected into the reaction chamber prior to ozone treatment may be different from the control gas injected into the reaction chamber subsequent to ozone treatment. For instance, prior to ozone treatment, during heating of the reaction chamber, the atmosphere control gas may comprise an inert gas such as Argon or Helium, and subsequent to ozone treatment, the atmosphere control may be a reaction gas, such as a reducing gas, in particular $H_2$ to reduce the copper support layer, or an oxidative gas, in particular $O_2$ to control the membrane pore size.

The outlet of the gas flow controller 15 may be connected to the multi-entry port valve 59 though an inlet 7 of multiport valve 59 being in fluid communication with the reactor gas inlet 6.

The reactor chamber heating system 51 comprises a temperature sensor 20 configured to measure the temperature inside the reactor chamber 4, heating means 18, and a temperature controller 19 connected to the heating means and the temperature controller to control the amount of heat generated by the heating means as a function of the temperature inside the reactor chamber 4 and the desired reaction temperature.

According to a particular embodiment, the millisecond valve 12 (MLV-2) is actuated in a controlled manner to deliver a pre-defined ozone quantity (e.g. from about $3 \times 10^{16}$ to about $3.8 \times 10^{17}$ molecules cm$^{-3}$, such as about $3.2 \times 10^{16}$ to about $3.5 \times 10^{17}$ molecules cm$^{-3}$) for a pre-defined time (e.g. from about 0.01 to about 0.3 seconds) in order to keep the graphene etching time well below 1 second.

According to a particular embodiment, gas selective filters according to the invention have a pore density of about $1.0 \times 10^{12}$ to about $1.6 \times 10^{12}$ cm$^{-2}$.

According to a particular embodiment, gas selective filters according to the invention have a pore-size distribution of about 0.1 to about 0.5 Å, typically of about 0.2 Å.

According to a particular aspect, the gas selective filters according to the invention can be advantageously used for carbon capture ($O_2/N_2$, $CO_2/CH_4$ and $CO_2/N_2$ separation).

According to a particular aspect, the gas selective filters according to the invention have $O_2$ permeance of about 100 to about 1'300 GPU (e.g. 1'300 GPU).

According to a particular aspect, the gas selective filters according to the invention have $CO_2$ permeance of about 850 to about 11'850 GPU (e.g. 11'850 GPU).

According to a particular aspect, the gas selective filters according to the invention have $O_2/N_2$ selectivity of about 1.6 to about 3.4 (e.g. 3.4).

According to a particular aspect, the gas selective filters according to the invention have $CO_2/O_2$ selectivity of about 7.4 to about 12.6 (e.g. 7.4).

According to a particular aspect, the gas selective filters according to the invention have $CO_2/N_2$ selectivity of about 8.6 to about 27.6 (e.g. 21.7).

According to a particular embodiment, the control of pore nucleation and expansion through the control of the pressure of the gaseous etchant ($O_3$) and the time of exposure of the graphene membrane to such a pressure in a method of the invention advantageously allowed to:
(i) increase the density of vacancy defects while maintaining the PSD suitable for $CO_2$-sieving,
(ii) slowdown the pore expansion by generating a high nucleation density in the millisecond time scale.

A rectangular-shaped high $O_3$ pressure exposure profile (typically to maintain a $O_3$ pressure of about 28 Torr that increases the area under the pressure-time curve leads to the narrowest PSD and an ozone gas pressure profile can be advantageously structured in the form of a plurality of pulses of high-pressure exposure according to the invention to achieve both an increase in the density of vacancy defects while maintaining a suitable PSD for $CO_2$ sieving and slowing down the pore expansion rate to control the pore size.

According to a particular embodiment, a method of the invention comprising a plurality of ozone gas pulse of high-pressure exposure is surprisingly much more effective than a method using an increase of the etching temperature because temperature accelerates the kinetics of nucleation as well that of etching whereas nucleation and expansion have separate dependencies on pressure.

According to a particular embodiment, the $CO_2/N_2$ separation performances of the graphene membrane can be further enhanced by structuring the transient ozone gas pulse in the form of multiple micro-exposure time at high pressure.

Implementation of the above concept resulted in narrower PSD in N-SLG compared to the state-of-the-art, improving the $CO_2$-sieving performance with $CO_2$ permeance of 4'400±2070 GPU and $CO_2/N_2$ selectivity of 33.4±7.9 with the highest selectivity close to 40.

The remarkable observed $CO_2$ permeance is much higher than the $CO_2$ permeance obtained from the commercial membranes which is not higher than about 1'020 GPU since the obtained $CO_2$ permeances were around 3'000 GPU and even up to about 25'530 GPU for a plurality of pulses. Further, the $CO_2/N_2$ selectivity of the gas selective filters according to the invention (typically about 15.0 for single pulse, and from 12.5 to about 39.8 for plurality of pulses) would allow their use as a valuable tool for $CO_2$ capture from efflux gases (e.g. steel and cement industries) and without the need of costly $N_2$ pressurization.

The high permeance would reduce the needed membrane area for treating a given volume of gas mixture, thereby, will reduce the capital cost of the separation process. The reduced area in turn, will reduce the pressure drop along the feed side, which can prove to be crucial for the low-feed-pressure separation application such as post-combustion capture.

The invention having been described, the following examples are presented by way of illustration, and not limitation.

EXAMPLES

Example 1: Method of Single-Layer Membrane with a Molecular Sieving Resolution of 0.2 Å

Figure 2:
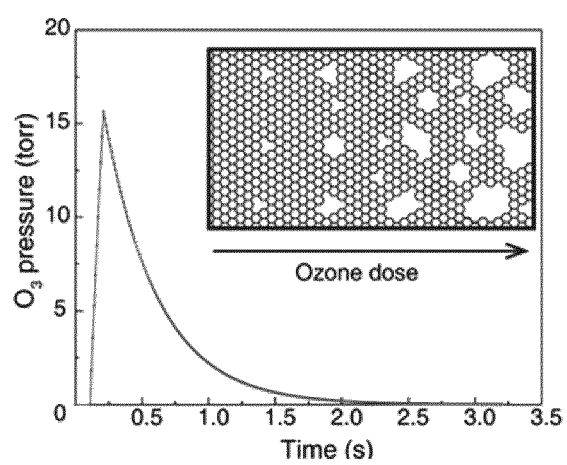
Figure 2:
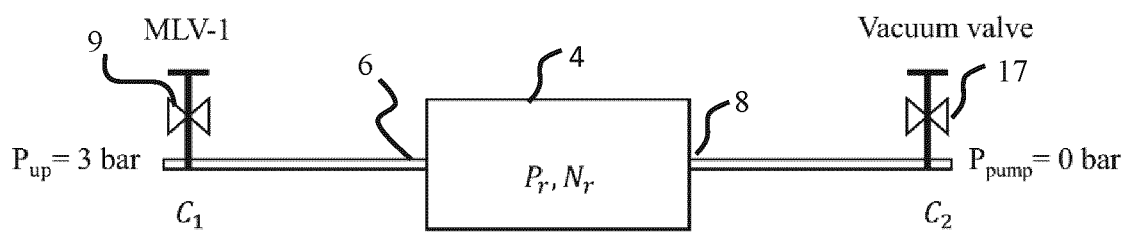
Figure 2:
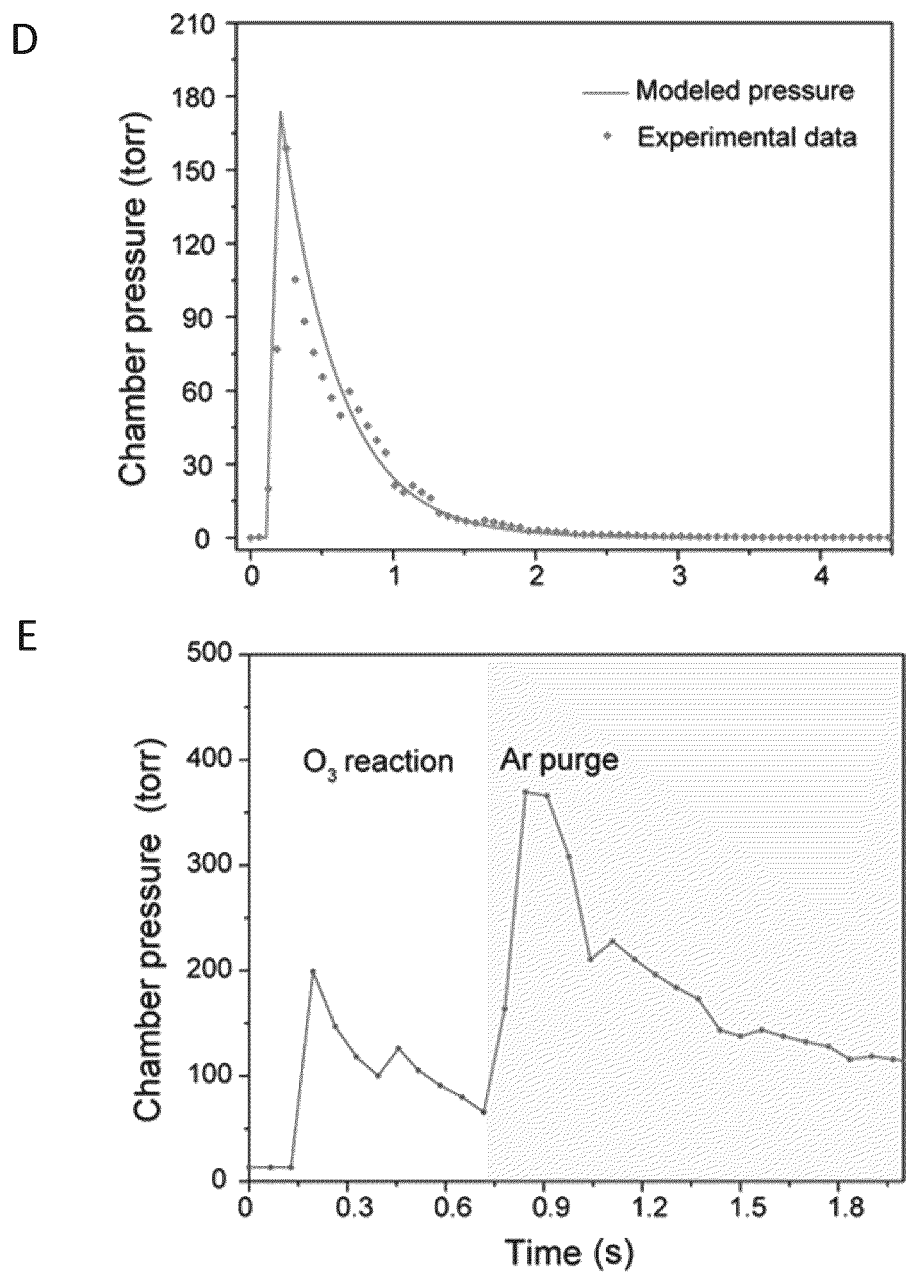

A method of the invention for the preparation of a gas selective filter is illustrated on FIGS. 1 & 2 and as detailed below.

Step a: A Synthesized CVD Graphene on a Sacrificial Support Layer is Provided

A supported graphene was provided as a CVD monolayer graphene 1 supported on a sacrificial support layer 2 (e.g. Cu) which was synthesized by low-pressure CVD (LPCVD) on a Cu foil as earlier described (Li et al., 2009, *Science*, 324, 1312-1314; Bae et al., 2009, *Nat. Nanotechnol.* 5, 1-5). Briefly, the Cu foil was annealed at 1000° C. in a $CO_2$ atmosphere at 700 Torr for 30 min to remove the organic contaminations. Then, the $CO_2$ flow was stopped and the chamber was evacuated. Subsequently, 8 sccm of $H_2$ was introduced in the chamber to anneal the Cu surface at 1000° C. For graphene growth, 24 sccm of $CH_4$ was added at a total pressure of 460 mTorr for 30 min. After the growth, the chamber was rapidly cooled down to room temperature while maintaining the $H_2$ flow.

The Cu foil was pre-treated by thermal annealing to obtain Cu (111) to improve the uniformity of graphene and to reduce the density of intrinsic vacancy defects as follows: a commercial Cu foil was thermally pre-annealed in a three-zone high-temperature furnace equipped with a high-purity alumina tube (99.8% purity, diameter: 5 cm, length: 1.2 m, MTI Corp.), covered by a fused quartz tube (diameter: 6 cm, length: 1.4 m, MTI Corp.) to prevent the silica contamination. Cu foils sourced from Alfa-Aesar (99.8% purity, 25 µm), and Strem Chemicals Inc. (99.9% purity, 50 µm) were placed in the furnace and heated to 1000° C. with 700 Torr $CO_2$ to remove the organic contamination (Strudwick et al., 2015, *ACS Nano.*, 9, 31-42). Then, $CO_2$ was pumped out and the reactor was filled with 10/90 H₂/Ar mixture to a pressure of 700 Torr. Subsequently, the reactor was maintained at 1075° C. for 1 h. This was followed by a controlled cooling of 0.1° C. min⁻¹ to 1000° C., after which the reactor was cooled down to room temperature.

Step b: Subjecting the CVD Graphene on a Sacrificial Support Layer to Control Nucleation and Expansion of Vacancy Defects by O₃ Pulse The single-layer graphene on copper (1, 2) obtained as described above was placed on a support for single-layer graphene 3 in a millisecond gasification system equipped with 1-inch×10 cm stainless steel reactor chamber 4 with a gas purge system 55 a pressurized ozone delivery system 52 and a reactor chamber atmosphere controlling system 53. The purge system 55 comprises a vacuum generation system 56 comprising a vacuum pump 16 and a vacuum control valve 17. The reactor chamber atmosphere controlling system 53 is connected to a control gas (e.g. Ar or H₂) inlet 7 and a control gas flow controller 15, wherein said control gas (e.g. Ar or H₂) inlet 7 is in fluid communication with the reactor chamber 4 through a multiport valve 59 connected to the reactor inlet 6.

The ozone delivery system 52 comprises an ozone source 14, 10 connected to the reactor chamber 4 through a millisecond leak valve 9 (MLV-1).

The gas purge system 55 preferably comprises a purge gas source 65 in fluid communication with the reactor gas inlet 6 of the reactor chamber 4 through a millisecond leak valve 12 (MLV-2).

The ozone source comprises a buffer tank reservoir 10 containing an oxygen and ozone mixture generated by ozone generator 14 which is maintained at a pressure of 1 bar-5 bar pressure with a pressure regulator 13 by a continuous mixture flow of O₂ and O₃ (9 mol % in O₃) generated by an ozone generator 14 (Absolute Ozone® Atlas 30).

The single-layer graphene on copper (1, 2) was loaded in the reactor chamber 4 which was equipped with a reactor chamber heating system 51 comprising heating means 18 (e.g. a heating tape wrapped around the reactor chamber), a temperature controller 19, and a temperature sensor 20 (e.g. a thermocouple) placed in the reactor chamber 4 to monitor the temperature inside the reactor chamber 4. The reactor chamber 4 containing the single-layer graphene on copper 1 was heated (e.g. 120-290° C.) under an H₂ atmosphere (0.8 Torr) provided through the reactor chamber atmosphere controlling system (e.g. mass flow controller) during the temperature ramping stage (from room temperature to reactor temperature) of the reactor chamber heating system 51. Then, the inert gas inlet was switched to Ar and stabilized to the reactor temperature (e.g. 250° C.). Then, the millisecond leak valve 9 (MLV-1) controlled by a LabVIEW™ program was opened within a certain time (e.g. for 0.01-0.2 s) to deliver ozone from the buffer tank reservoir 10 into the reactor chamber 4 in the form of a short O₃ pulse, with peak O₃ pressure in the range of 3-27 Torr (FIG. 2B), while the vacuum control system 56 extracted O₃ to control the short retention time of reactor. Optionally, the millisecond leak valve 12 (MLV-2) of the gas purge source 65 controlling an inert gas purge (pressurized Ar or He, e.g. 10 bar) was opened after a synchronized delay time ($t_d$) (e.g. 0 s-1s) to facilitate a rapid removal of O₃ after the ozone delivery (when MLV-1 closed) and the inert gas purge would last for about 10 s (FIG. 2E).

The O₃ dose was calculated by the area under the curve of O₃ pressure as a function of time which was controlled by varying the MLV-1 opening time (τ) and O₃ supply pressure ($P_{up}$) as detailed in Table 1 below (FIG. 2D).

TABLE 1

| τ (s) | $P_{up}$ (bar) | Purge gas | $t_d$ (s) | Ozone dose (molecules cm⁻³ s) |
|---|---|---|---|---|
| 0.01 | 3 | no purge | — | 4.8 × 10¹⁶ |
| 0.05 | 3 | no purge | — | 1.2 × 10¹⁷ |
| 0.1 | 3 | no purge | — | 2.2 × 10¹⁷ |
| 0.2 | 3 | no purge | — | 3.5 × 10¹⁷ |
| 0.05 | 5 | Ar | 0.5 | 1.8 × 10¹⁷ |
| 0.1 | 3 | Ar | 0 | 3.2 × 10¹⁶ |
| 0.1 | 5 | Ar | 0 | 7.7 × 10¹⁶ |
| 0.1 | 3 | Ar | 0.5 | 1.6 × 10¹⁷ |
| 0.1 | 5 | Ar | 0.5 | 2.9 × 10¹⁷ |
| 0.1 | 3 | Ar | 1 | 2.0 × 10¹⁷ |
| 0.2 | 5 | Ar | 0 | 1.4 × 10¹⁷ |
| 0.2 | 3 | Ar | 0.5 | 2.7 × 10¹⁷ |
| 0.05 | 5 | Pressurized He | 0.2 | 1.2 × 10¹⁷ |
| 0.1 | 5 | Pressurized He | 0.2 | 2.1 × 10¹⁷ |

A model of the pressure control system for the reactor is shown in FIG. 2C. The inlet of the reactor is connected with a millisecond leak valve (MLV). The MLV connects MGR with O₂/O₃ reservoir where the pressure of the reservoir is $P_{up}$. The outlet of the MGR is connected with a vacuum pump via an outlet valve, maintaining a $P_{pump}$ of 0 bar. The total pressure of O₂/O₃ mixture in MGR, $P_r$, is initially 0.

A mathematical model was built to investigate the pressure profile of ozone when MLV is opened and closed. Briefly, the MLV-1 valve is opened at t=0 s, and is closed at t=τ. During 0<t<τ, the O₂/O₃ mixture is delivered in the MGR. We define $C_1$ as a flow coefficient of MLV (flow rate across MLV is obtained by multiplying flow coefficient with pressure difference across MLV as shown in eq. S1), $$\left.\frac{dN}{dt}\right|_{in}$$

as the inward flow rate of gas in the reactor chamber.

$$\left.\frac{dN}{dt}\right|_{in} = C_1(P_{up} - P_r) \quad \text{(eq. S1)}$$

$C_2$ is defined as a transport coefficient of outlet valve, $$\left.\frac{dN}{dt}\right|_{out}$$

as the flow rate of gas pumped out from the reactor chamber.

$$\left.\frac{dN}{dt}\right|_{out} = C_2(P_r - P_{pump}) = C_2 P_r \quad \text{(eq. S2)}$$

Hence, the amount of gas accumulated in the reactor chamber, $$\frac{dN}{dt},$$

is calculated as follows:

$$\frac{dN}{dt} = C_1(P_{up} - P_r) - C_2 P_r \qquad \text{(eq. S3)}$$

Therefore, during $0<t<\tau$, the pressure change in the reactor chamber is $$\frac{dP}{dt} = \frac{RT}{V_r}(C_1(P_{up} - P_r) - C_2 P_r) \qquad \text{(eq. S4)}$$

where $V_r$ is the reactor volume (150 cm$^3$).

When $t>\tau$, the MLV is closed, and the $O_2/O_3$ mixture is pumped out by the vacuum pump leading to exponential decay of the pressure. The corresponding change in pressure profile is captured by following:

$$\frac{dN}{dt} = -C_2 P_r \qquad \text{(eq. S5)}$$

$$\frac{dP_r}{dt} = -\frac{RT}{V_r} C_2 P_r \qquad \text{(eq. S6)}$$

After solving eqs. S4 and S6, we could calculate the pressure of the reactor chamber.

$0<t<\tau$ $$P_r = \qquad \text{(eq. S7)}$$
$$P_0 \exp\left(-\frac{RT(C_1+C_2)}{V_r}t\right) + \frac{C_1}{C_1+C_2} P_{up}\left[1 - \exp\left(-\frac{RT(C_1+C_2)}{V_r}t\right)\right]$$

When $t=\tau$, $P_r = P_{r-\tau}$
$t>\tau$ $$P_r = P_{r-\tau} \exp\left(\frac{RTC_2}{V_r}(t-\tau)\right) \qquad \text{(eq. S8)}$$

By fitting the experimental data of MLN open for $\tau=0.1$ s (FIGS. 2B & 2D, $C_1$ and $C_2$ were extracted as $5.5\times10^{-8}$ and $1.7\times10^{-7}$ mol s$^{-1}$ Pa$^{-1}$, respectively.

The $O_3$ dose is defined to describe the total amount of $O_3$ delivery in the reactor chamber, calculated as follows:

$$\text{Dose} = \int_{t_0}^{t_f} [O_3] dt = \int_{t_o}^{t_f} N_A \frac{P_{O_3}}{RT} dt \qquad \text{(eq. S9)}$$

where $[O_3]$ is the concentration of $O3$, $P_{O_3}$ is the partial pressure of $O3$, $N_A$ is Avogadro number $6.023\times10^{23}$ mol$^{-1}$, $R=8.314$ J mol$^1$K$^{-1}$. $t_0$ is the etching start time (when the valve opens), and $t_f$ is the time at which the etching finishes. Without the Ar purge, $t_f$ is the time that the ozone pressure reduces to zero. With Ar purge, $t_f$ corresponds to the time when Ar purge starts. The dose reported here was calculated by taking average value of the integration of multiple pressure profiles.

Overall, $O_3$ dosage of $3.2\times10^{16}$ to $3.5\times10^{17}$ molecules cm$^{-3}$ s was delivered while keeping the etching time well below 1 s.

Subsequently, the sample was cooled down to room temperature within the Ar atmosphere. After cooling down, the single-layer graphene on copper (1, 2) was annealing in the reactor within the H$_2$ atmosphere at 300° C. to reduce the copper.

The obtained single-layer graphene on copper (1, 2) was then used to prepared a reinforced membrane for us as a gas filter as previously reported (Huang et al., 2018, *Nat. Commun.* 9, 2632) were a nanoporous carbon (NPC) film was deposited on graphene as reinforcement. The NPC was fabricated by spin-coating a solution of turanose and polystyrene-co-poly(4-vinyl pyridine) (PS-P4VP) on top of the N-SLG. 0.1 g block-copolymer (poly (styrene-b-4-vinyl pyridine), Polymer Source) and 0.2 g turanose (Sigma-Aldrich) were dissolved in DMF (Sigma-Aldrich), followed by the 180° C. heating treatment. Pyrolysis of the polymer film was conducted at 500° C. in a H$_2$/Ar atmosphere for 1 h, forming the NPC film on top of graphene. The NPC/N-SLG/Cu was floated on a Na$_2$S$_2$O$_8$ solution (20% wt. in water) to etch the Cu foil. After Cu etching, the floating NPC/N-SLG film was rinsed in deionized water to remove the residues. Finally, NPC/N-SLG was scooped on the porous tungsten support.

Example 2: Characterization of the Obtained Graphene Membrane

The obtained graphene membrane was characterized by Raman, transmission electron microscopy (TEM), high resolution TEM (HRTEM) and Aberration-corrected HRTEM (Ac-HRTEM) imaging as follows:

Raman Characterization

Graphene membranes obtained as described under Example 1 under different O$_3$ dose conditions were transferred onto a SiO$_2$/Si wafer by standard wet-transfer method. Single-point data collection and mapping were performed using Renishaw micro-Raman spectroscope equipped with a blue laser ($\lambda_L$=457 nm, $E_L$=2.71 eV) and a green laser ($\lambda_L$=532 nm, $E_L$=2.33 eV). Analysis of the Raman data was carried out using MATLAB™. For calculation of the D and the G peak height, the background was subtracted from the Raman data using the least-squares curve fitting tool (lsqnonlin).

Figure 3:
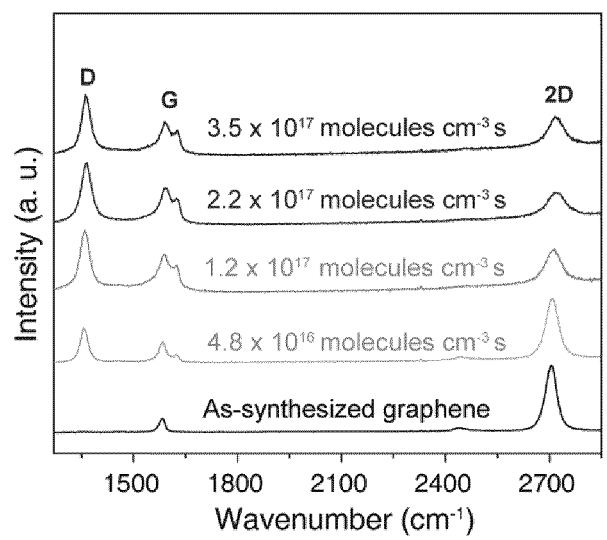
FIG. 3 provides Raman spectroscopy characterization of graphene membranes exposed to $O_3$ various doses as described in Example 2. A: Raman spectra of graphene exposed to various doses; B: $I_D/I_G$, $I_{2D}/I_G$ ratios ($\lambda_L$=457 nm) as a function of the ozone dose; C: Raman map of the $I_D/I_G$ ratio ($\lambda_L$=532 nm) on a sample using ozone dose of $1.6 \times 10^{17}$ molecules cm$^{-3}$ s at 250° C.
Figure 3:
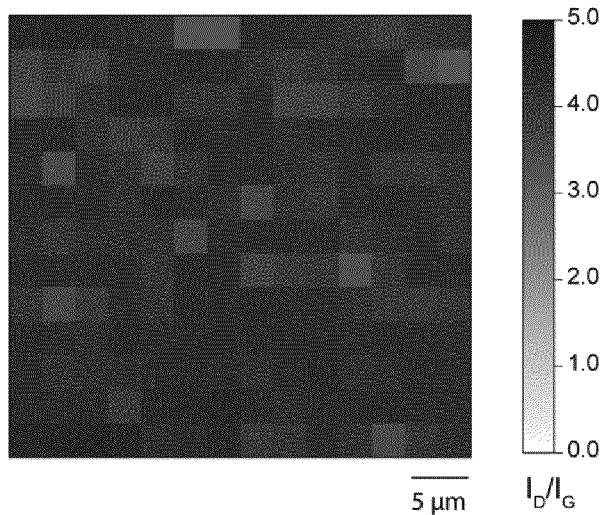
Figure 3:
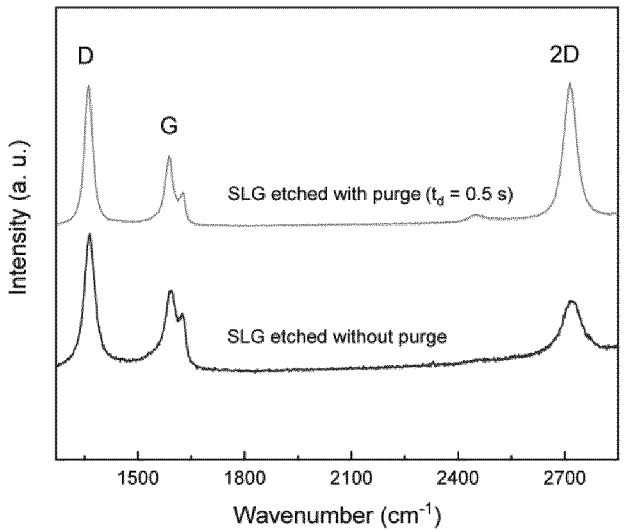

The Raman spectroscopy of graphene films, exposed to increasing O$_3$ dose between $4.8\times10^{16}$ to $3.5\times10^{17}$ molecules cm$^{-3}$ s, revealed significant D and D' peaks (FIGS. 3A & C). The $I_D/I_{D'}$ ratios were well below 7 reaching 3, indicating that most of the defects were edge-like defects of graphite. $I_D/I_G$ mapping indicated that the defects could be generated uniformly over a large area (FIG. 3B). This supports that a method of the invention allows to prepare high quality (Normally, $I_{2D}/I_G$ of high quality single-layer graphene is higher than 2.0) graphene membranes ($I_{2D}/I_G$ ratio of 4.8±0.25) with a low density of intrinsic defects ($I_D/I_G$ ratio of 0.04±0.02).

TEM Sample Preparation

Transfer-induced contaminations were minimized by reinforcing the graphene membranes obtained as described under Example 1 with a premade thin porous polymer film (e.g. polybenzimidazole) before transferring it to the transmission electron microscopy (TEM) grid. Using a premade porous film avoids polymer solution-induced contaminations in the surface of nanoporous graphene. Such contaminations are difficult to avoid when directly forming the porous film on top of graphene (He et al., 2019, *Energy Environ. Sci.*, 12-16; Zhao et al., 2019, 5, eaav185) or when using a PMMA-based transfer approach (Gong et al., 2013, J. Phys. Chem. C. 117, 23000-23008). Moreover, the micrometer-sized open areas of the premade porous film offer plenty of opportunities for imaging nanoporous graphene. The thin porous polymer reinforcement layer was made of a thermally resistant polybenzimidazole copolymer (Fumion® AM provided by FUMATECH BWT GmbH, Germany) which can be carbonized once it sits on top of nanoporous graphene to form a thermally conductive carbon porous reinforcement ideal for Ac-HRTEM imaging.

The polybenzimidazole copolymer was processed into a porous thin film using non-solvent induced phase separation. Briefly, a drop of a 1.5 wt. % solution of the polymer in DMAc was spread on top of a 25 µm Cu foil by gently pressed it with a glass slide. The Cu foil coated with the thin polymer solution was immersed in an IPrOH bath to precipitate the polymer solution layer into a thin porous polymer film. After drying the porous polymer film, the Cu foil was etched in a 20 wt. % sodium persulfate aqueous bath and the remaining floating polybenzimidazole copolymer porous film was transferred to a water bath to remove the sodium persulfate. The floating polybenzimidazole copolymer porous film was scooped from the water bath using the Cu foil with nanoporous graphene on its surface. After the porous film completely dried on top of the nanoporous graphene, a drop of IPrOH was poured on it to enhance the adhesion of the polymer film to the nanoporous graphene surface upon evaporation of the IPrOH. Subsequently, the porous polymer film was pyrolyzed at 500° C. in the flow of $H_2$/Ar, leading to the formation of nanoporous graphene reinforced by a porous carbon. Next, the Cu foil was etched in a 20 wt % sodium persulfate bath and the resulting reinforced nanoporous graphene was washed with water and transferred to a 400-mesh gold TEM grid. Finally, the TEM grid loaded with the reinforced nanoporous graphene was cleaned inside activated carbon at 900° C. for one hour in the presence of $H_2$ to remove contaminations covering the nanopores. Nanoporous graphene adsorbs contaminations easily, hence the cleaning at 900° C. in $H_2$ is crucial to expose most of the nanopores prior to the imaging session. The cleaning was done taking the following precautions to avoid the presence of $O_2$ in the system which could enlarge the pores: (i) Adsorbed $O_2$ was removed prior to heating to high temperatures by evacuating the system three times and applying a vacuum of ca. $2\times10^{-3}$ Torr at 200° C. for 2 h. (ii) Prior to heating to 900° C. the system was pressurized to ca. 850 Torr with a constant flow of $H_2$ to avoid $O_2$ leak. The system was kept pressurized at ca. 850 Torr under a constant flow of $H_2$ for the rest of the cleaning procedure. Control experiments proved that grid preparation steps did not lead to the incorporation of nanopores.

HRTEM Imaging

High-resolution TEM (HRTEM) was performed using a Talos F200X (FEI) microscope operated at an acceleration voltage of 80 kV did not nucleate or expand nanopores. The dose rate was maintained at ca. 500 $e^-s^{-1}$ $Å^{-2}$ during imaging. To clearly reveal the nanopores, and to verify that the pores did not expand during imaging the following procedure was followed: 1) 30 consecutive images were taken with an exposure time of 2 s each; ii) the first and last images were compared to verify that no pore expansion occurred during imaging; iii) the first 5 to 8 images were integrated together to form the final image where the nanopores are clearly visible. Typically, during HRTEM imaging of the MGR-treated graphene samples in Talos the pores experienced a dose of ca. $8\times10^3$ $e^-Å^{-2}$ during focusing and imaging.

Ac HRTEM Imaging

Aberration-corrected (Cs) HRTEM (Ac-HRTEM) was performed using a double-corrected Titan Themis 60-300 (FEI) equipped with a Wein-type monochromator. An 80 keV incident electron beam was used for all experiments to reduce the electron radiation damage. The incident electron beam was monochromated ("rainbow" mode illumination) to reduce the effects of chromatic aberration, and a negative Cs of ~17-21 µm and slight over focus were used to give a "bright atom" contrast in the images. The dose rate was maintained at ca. $2\times10^4$ $e^-s^{-1}$ $Å^{-2}$ during imaging and a slit was used to expose only the area of the sample being imaged to the electron beam.

The maximum energy that can be transferred to a carbon atom by an 80 keV incident electron is 15.8 eV which is below the knock-on energy threshold for an in-lattice carbon atom (i.e., 17 eV) (Girit et al., 2009, Science. 323, 1705-1708). In agreement, no knock-on from pristine areas was observed during imaging. Similar to Grit et al., 2009, supra, reconfiguration of the pore edge in the scale of seconds and in occasions even in less than a second and knock-on of edge atoms was observed (i.e., pore expansion) only after longer exposure times. The pores imaged to construct the pore library of the graphene samples after MGR treatment were exposed to doses that were low enough to avoid pore expansion. Typically, during imaging of the MGR-treated graphene samples the pores experienced a dose of ca. $2\times10^5$ $e^-Å^{-2}$ during focusing and imaging and the first 5-10 frames (each frame corresponds to a dose of ca. $5\times10^3$ $e^-Å^{-2}$) were integrated into the final image. When needed, the images were processed with a combination of Gaussian, average and/or Bandpass filters to make the graphene lattice clearer.

Analysis of TEM Images

A hexagonal mesh was manually fitted to match the graphene lattice surrounding the pore and the points of the mesh corresponding to the missing carbon atoms of the pore were subsequently removed. Dangling bonds and Stone-Wales defects were ignored. Such analysis is a powerful tool to quantify the number of missing atoms and to draw the shape of the pores. The obtained edge configuration of the pore should be taken with caution because at the imaging conditions used (i.e., 80 keV) edge reconfiguration is present. A total of 204 pores from three independently prepared samples were analyzed for the graphene treated with the following MGR conditions: 250° C., $1.6\times10^{17}$ molecules $cm^{-3}$ ($\tau=0.1$ s, $t_d=0.5$ s Ar).

The diameter of the pores was determined using ImageJ™ software. The pore-diameter was calculated by fitting the largest possible circle that fitted inside the pore. Only pores surrounded by a graphene lattice were used for the analysis (i.e., pores touching a contamination were ignored). A total of 347 pores from three independently prepared samples were analyzed for the graphene treated with the following MGR conditions: 250° C., $1.6\times10^{17}$ molecules $cm^{-3}$ s ($\tau=0.1$ s, $t_d=0.5$ s Ar). The Ac-HRTEM images of the vacancy defects and lattice-fitted pore structures is presented on FIGS. 4A & B. The size distribution of the vacancy defects for the pores missing between 6 to 20 carbon atoms based on Ac-HRTEM and calculated size distribution based on the model described below is presented on FIG. 4C.

Figure 4:
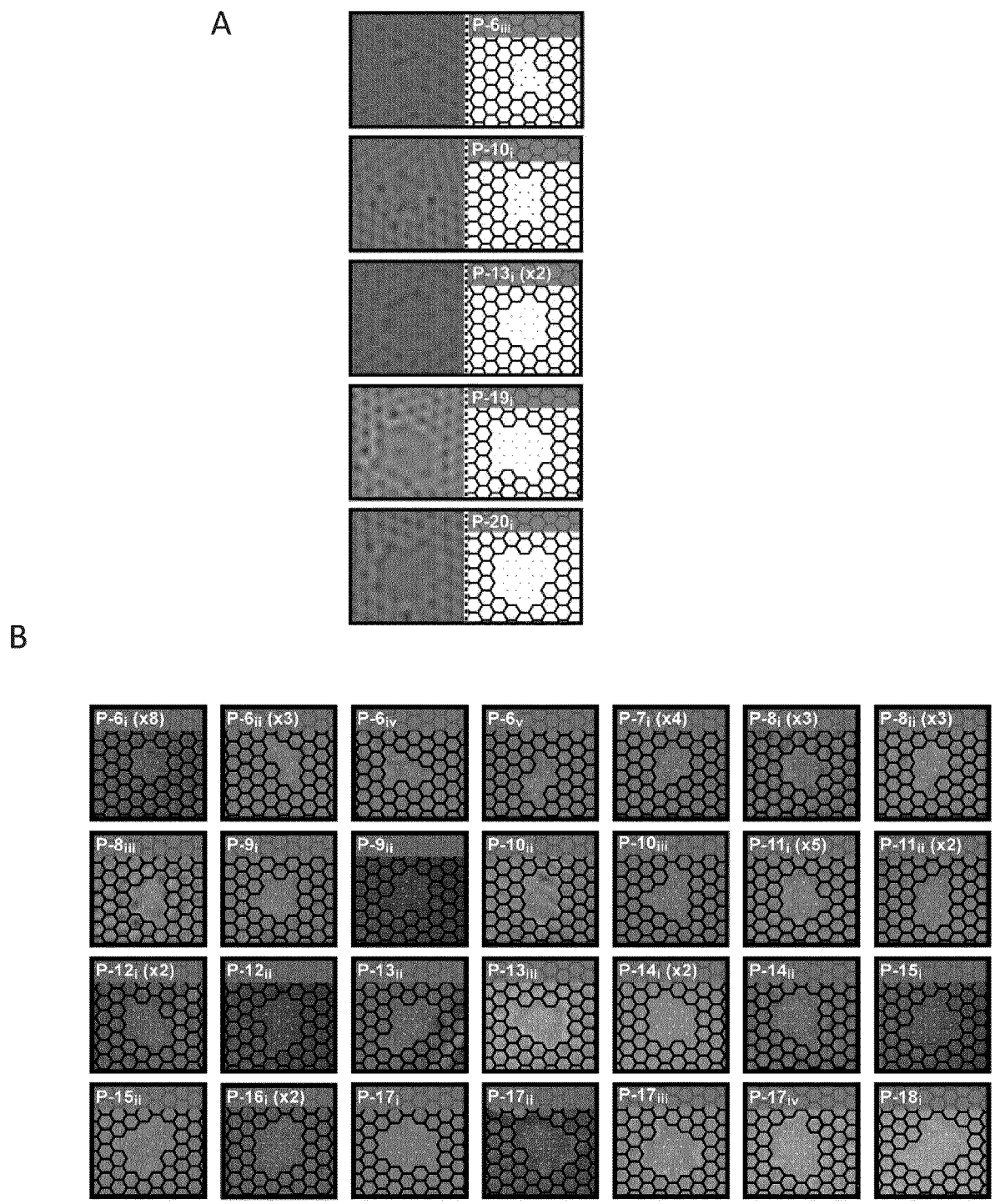
FIG. 4 Ac-HRTEM (Aberration-corrected high-resolution transmission electron microscopy) images of the vacancy defects and lattice-fitted pore structures in the graphene membranes prepared by a method of the invention (MGR condition: 250° C., ozone dose: $1.6 \times 10^{17}$ molecules cm$^{-3}$ s, $t_d$=0.5 s Ar) as described in Example 3 (A & B). The size distribution of the vacancy defects (number of missing carbon atoms) based on Ac-HRTEM images and the calculated size-distribution based on the model as described in Example 3 (C) and the pore size distributions of vacancy defects as extracted by Ac-HRTEM images and calculated based the etching kinetics (D).
Figure 4:
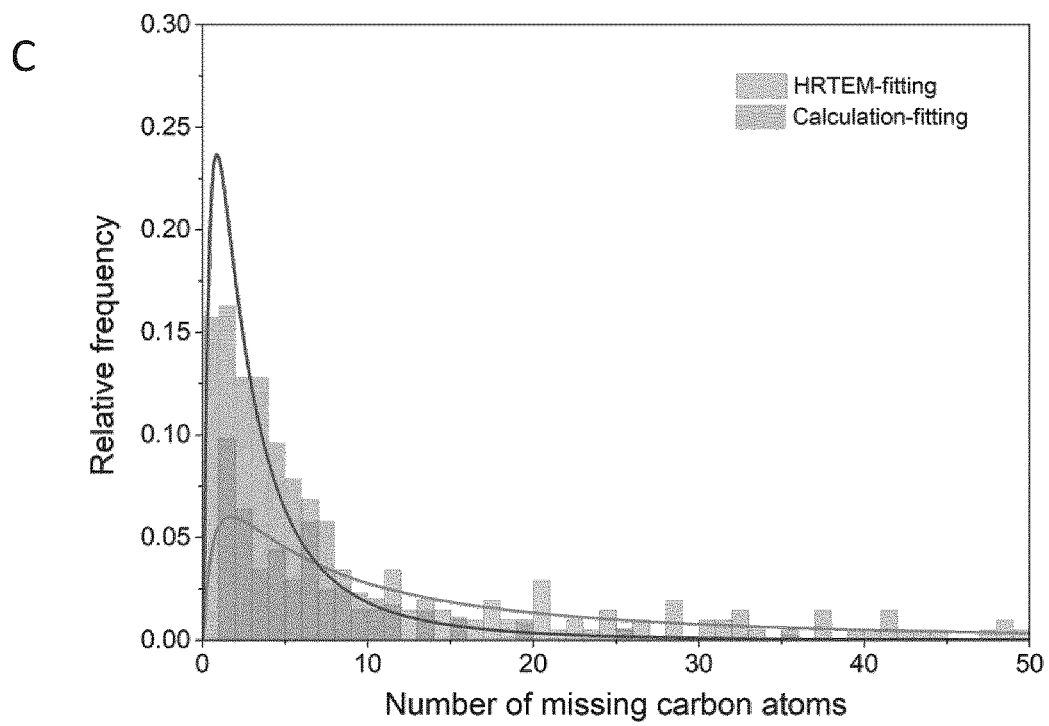
Figure 4:
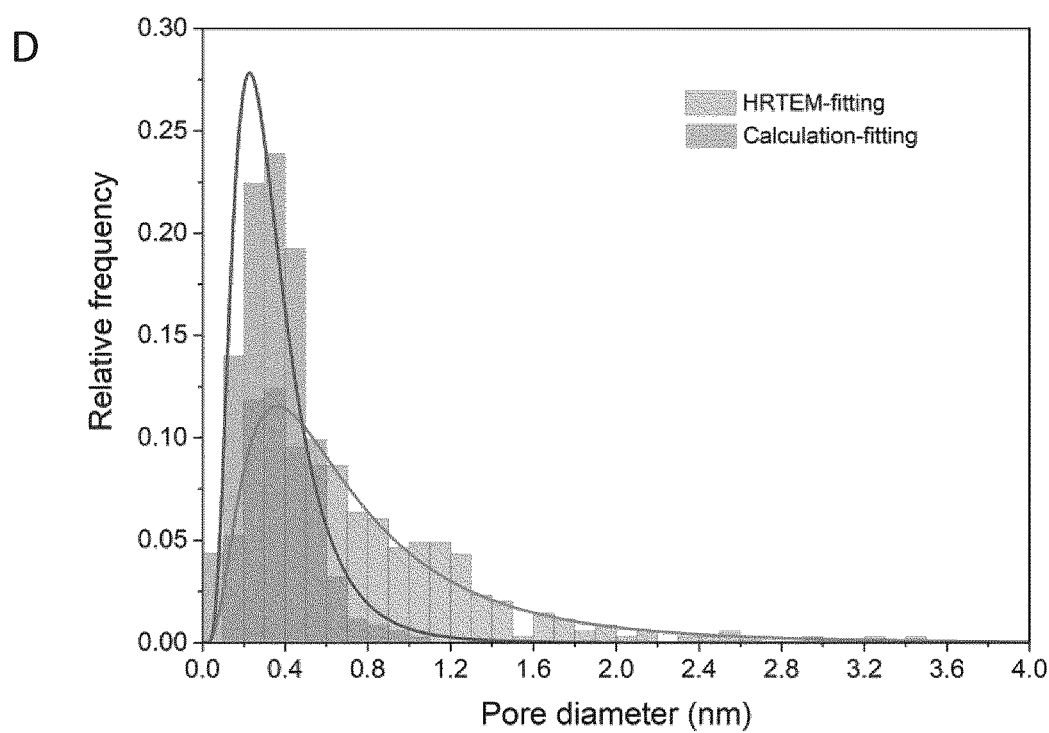

High-resolution transmission electron microscopy (HR-TEM) and aberration-corrected HRTEM (Ac-HRTEM) of the graphene were carried out to understand the pore-size distribution (PSD), pore density and pore structure of the graphene membranes obtained by a method of the invention. Several nanopore isomers, defined as pores of different structures formed by removing exactly V number of atoms, were observed. These isomers are referred to as P-Vj. For example, P-10i, P-10ii, and P-10iii are made by removing 10 carbon atoms but host different structures (FIGS. 4A & B). The relative population of isomers was consistent with the isomer cataloging of vacancy defects (Chu et al., 1992, *Surf Sci.* 268, 325-332). For example, P-11i and P-7i, predicted to be the most probable isomers of P-11 and P-7, respectively, were indeed observed most frequently. No other isomer of P-7i were observed perhaps attributing to the extremely high probability of P-7i (42%) and low probability of other P-7 isomers (<10%). Several high-probability isomers such as P-6iii, P-8ii, P-11i, P-12i, P-16ii, P-17i, and P-20iii were observed for the first time filling the gap between the observed and simulation-predicted gas-sieving nanopores (Chu et al., 1992, supra). Nanopores such as P-10i, P-13i, and P-16i, that have drawn vast attention for gas-sieving, were also observed, albeit they constitute only a small fraction of nanopore population. PSD based on the number of missing carbon atom had a log-normal distribution with a majority of nanopores smaller than P-16 (FIG. 4C). In the tail, several nanopores had elongated structure while several nanopores appeared to be formed by coalescence of smaller pores.

Etching experiments carried out at 150° C. with the same ozone dose as above yielded much lower pore density compared to that at 250° C. To estimate PSD, the expansion of pores nucleated during a certain time interval as a function of time was tracked. Briefly, the $O_3$ exposure was divided into n equal intervals, $\Delta t$. At the end of $O_3$ exposure, the number of missing carbon atom, $v_i$, for those pores which nucleated during time step $t_i$, could be calculated as following:

$$v_i = \sum_{m=i}^{m=n} \frac{\Delta C_m}{\sum_{k=1}^{m} N_k} = \frac{\Delta C_i}{N_1 + N_2 + \ldots N_i} + \ldots + \frac{\Delta C_n}{N_1 + N_2 + \ldots + N_n} \quad \text{(eq. 1)}$$

where $N_i$ is the number of new nuclei generated during a time step i, and $\Delta C_i$ is the total number of carbon atoms etched from the existing defects in time step i. The PSD extracted by the model agrees well with that from the Ac-HRTEM observations (FIG. 4D).

STM

Scanning tunneling microscope (STM) imaging was carried by using a low-temperature scanning tunneling microscope (CreaTec Fischer & Co. GmbH). The N-SLG samples were reduced under 50 sccm $H_2$ flow, at 800 Torr and 900° C. for 3 hours in a quartz tube furnace. Subsequently, the sample was put in STM ultrahigh vacuum (UHV) chamber as soon as in 1 hour.

Figure 5:
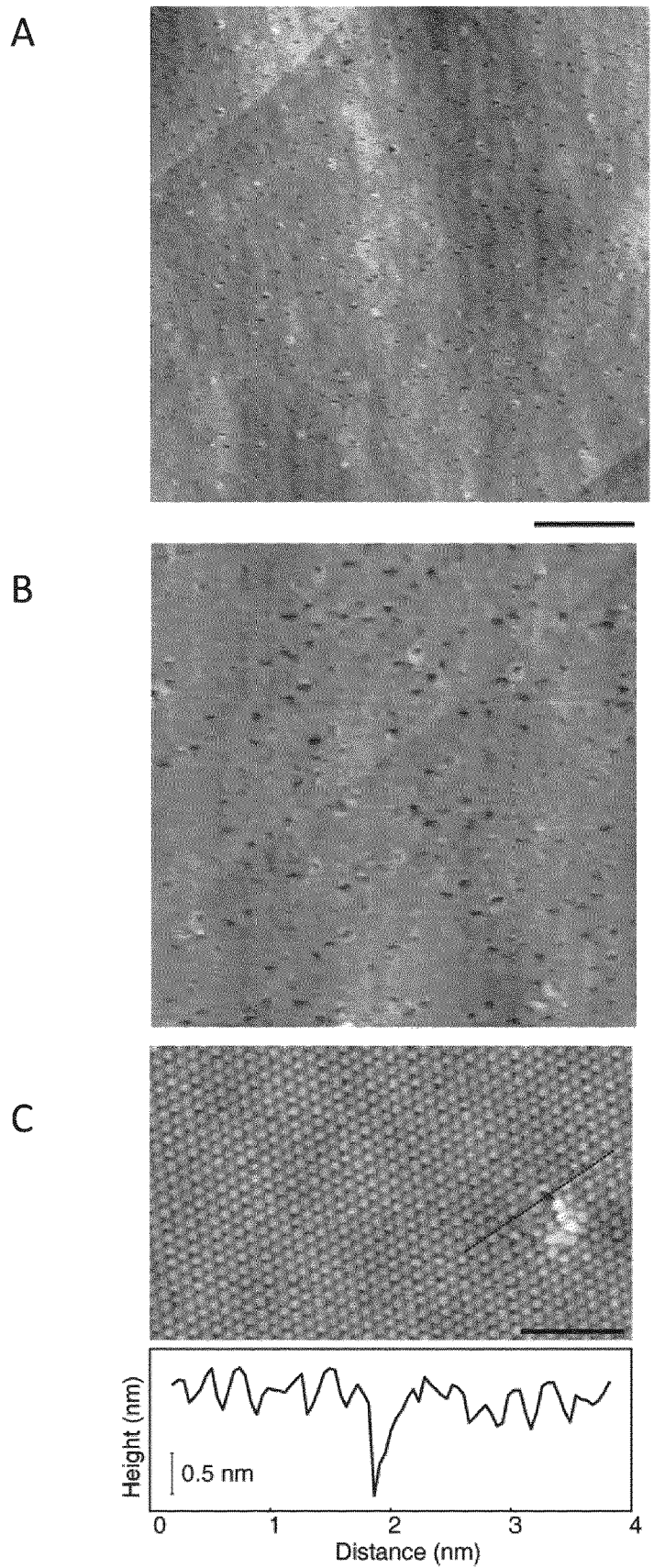
FIG. 5 provides STM images of the graphene membranes (MGR condition: 250° C., ozone dose: $1.6 \times 10^{17}$ molecules cm$^{-3}$ s, $t_d$=0.5 s Ar) of the invention with scale bars in (A) (B) and (C) are 100 nm, 40 nm and 1 nm, respectively and atomic-resolution STM image of nanopore (top C) and height profile across the nanopore (bottom C) as described in Example 2.

The graphene membranes obtained as described in Example 1 over the Cu foil were used without the need of transferring graphene (FIGS. 5A & B) and were heated inside the STM chamber at 900° C. for 3 hours to clean the surface before observations. STM imaging on porous graphene samples was performed with a UHV STM system (Createc) at 77 K and $2\times10^{-10}$ mbar. The STM probe was prepared by a mechanical cutting method from a commercial platinum and iridium (Pt/Ir) alloy wire (Pt: 90 wt %, diameter: 0.25 mm, Alfa Aesar). Images were acquired at different bias voltages and tunneling currents. The STM image tilt was reduced by flattening in WSxM software. Images based on scan size of 100 nm×100 nm revealed that a high density of vacancy defects (~$10^{12}$ $cm^2$) was incorporated in the lattice. The size of the vacancy defect was in agreement with the HRTEM observations (FIG. 5C). Occasionally, several nanopores appeared to be aligned and appear to be distributed more uniformly than anticipated from a purely stochastic etching (FIG. 5B). This unique arrangement has likely origin in the cooperative linear clustering of epoxy groups (O atoms bridging C—C bonds) formed by chemisorption of $O_3$ on graphene (Li et al., 2006, *Phys. Rev. Lett.*, 96, 5-8). The linear clustering is driven by the low-energy configuration of epoxy groups and is facilitated by a low barrier of diffusion of epoxy groups (Suarez et al., 2011, *Phys. Rev. Lett.*, 106, 8-11).

Example 3: Air Separation and Post-Combustion Carbon Capture Ability

Figure 6:
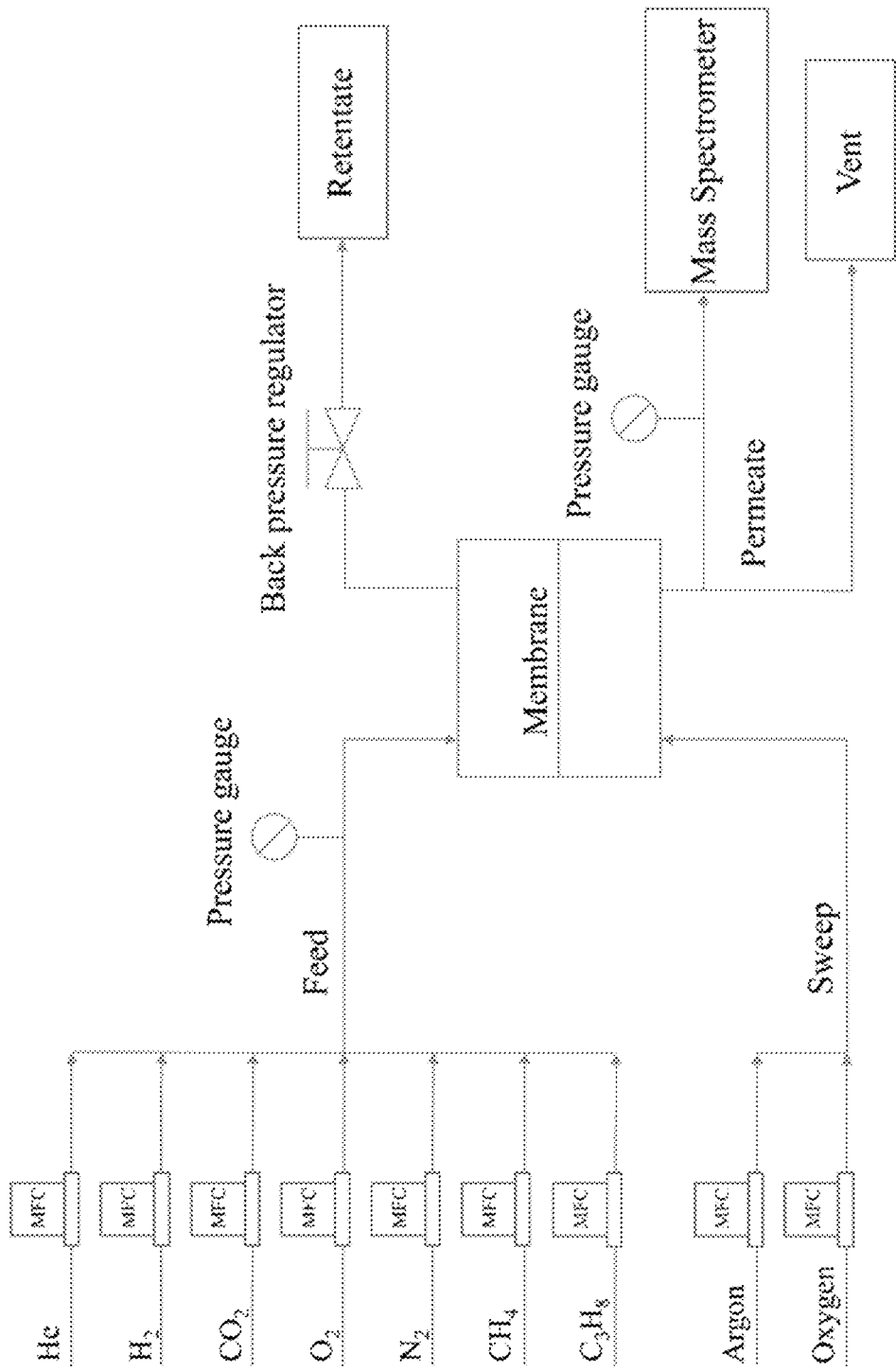
FIG. 6 provides a schematic view of the setup for gas permeance test as described in Example 3.

Single-component and mixture gas permeation tests were carried out in a permeation module as described on FIG. 6. All the permeation tests were conducted in the open-end mode. All equipment used in the permeation setup (the mass flow controllers (MFCs), oven and MS) were calibrated within a 5% error. The ozone treated graphene membranes obtained as described under Example 1 was sandwiched in the VCR-based module (Swagelok VCR fittings), making a leak-tight fitting. The feed and the sweep lines were pre-heated inside the oven to prevent temperature fluctuation. A pre-calibrated MFC regulated the flow rate of the feed gas, where the feed pressure (1.5-2.0 bar) was adjusted by the back-pressure regulator. Another pre-calibrated MFC controlled the flow rate of sweep gas (Ar) with 1 bar pressure, which carried the permeate gas to the pre-calibrated mass spectrometer (MS) for real-time analysis of the permeate concentration. The MS was pre-calibrated at similar concentrations in the permeate stream of He, $H_2$, $CO_2$, $O_2$, $N_2$, $CH_4$, and $C_3H_8$ in Ar. Before testing, all membranes were heated to 100° C. to remove the contaminations on the graphene surface. For the mixture permeation tests, an equimolar gas mixture or specific concentration (20% $CO_2$, 80% $N_2$) was used on the feed side. The measurements were carried out at continuously, in real-time, and only the steady-state data were reported. The gas flux was calculated once the steady-state was established.

Figure 7:
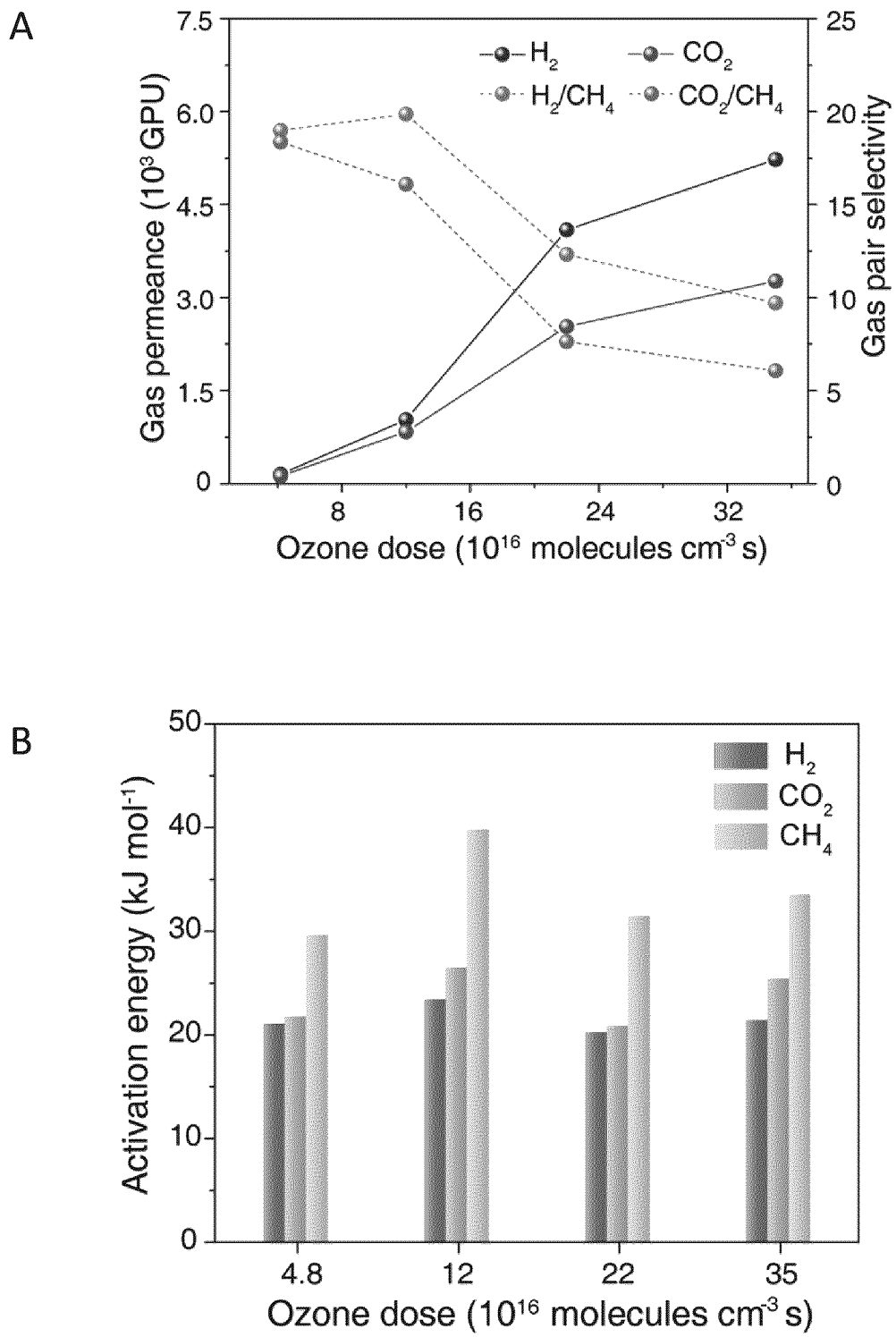
FIG. 7 provides a characterization of the gas sieving performance as described in Example 3 of graphene membranes of the invention treated with increasing dosage of $O_3$ according to a method of the invention. A: evolution of gas permeance as a function of ozone concentration; B: calculated activation energies; C: Gas separation performance of a graphene membrane subjected to ozone treatment in a method of the invention at 250° C. (τ=0.1 s) with varying purge delay time ($t_d$); D: Gas separation performance and pore-size distribution extracted from Ac-HRTEM of a graphene membrane subjected to ozone treatment in a method of the invention at 250° C. (ozone dose: $1.6 \times 10^{17}$ molecules cm$^{-3}$ s, to =0.5 s Ar), 290° C. (ozone dose: $1.8 \times 10^{17}$ molecules cm$^{-3}$ s, $t_d$=0.5 s Ar) and optimized (inert gas for reactor purge is Helium cooling by liquid nitrogen) 290° C. condition (ozone dose: $1.2 \times 10^{17}$ molecules cm$^{-3}$ s, $t_d$=0.2 s He).
Figure 7:
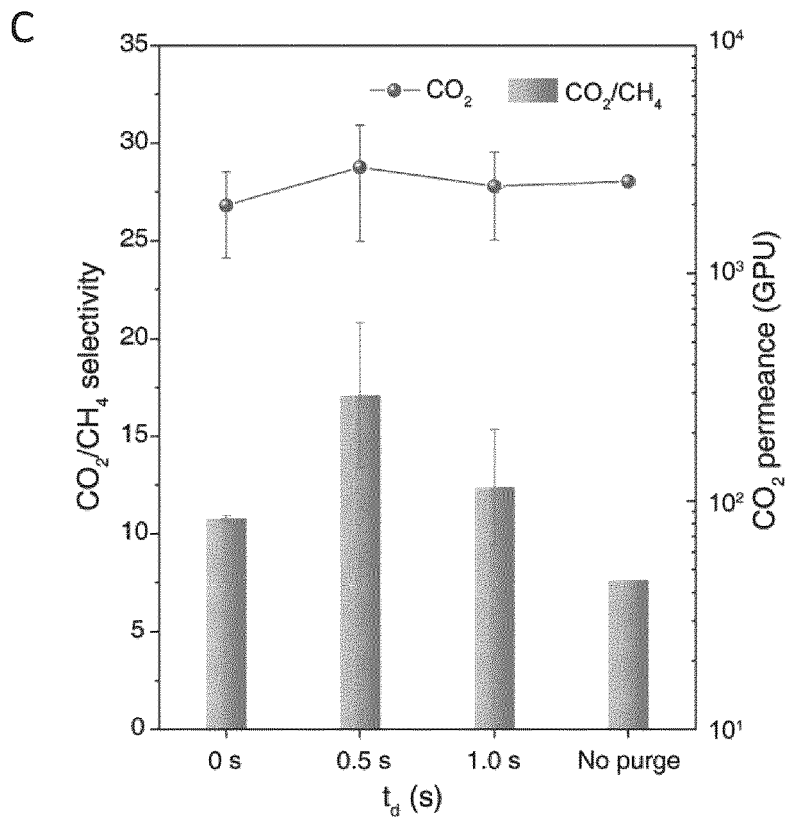
Figure 7:
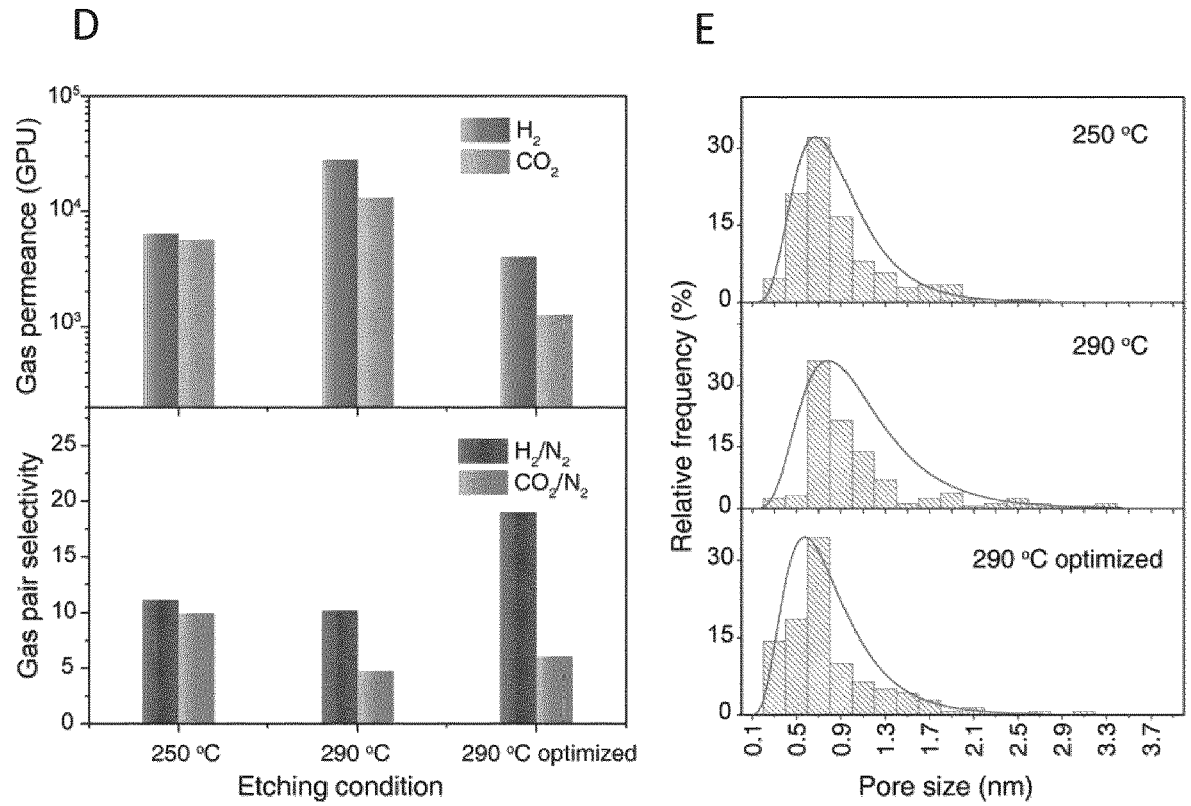

Gas flux was observed through 1-$mm^2$-sized ozone treated graphene membranes prepared according to a method of the invention using $O_3$ dosage of $3.2\times10^{16}$ to $3.5\times10^{17}$ molecules $cm^{-3}$ s ($\tau=0.01$-$0.2$ s), revealed that $H_2$ and $CO_2$ can be separated from $CH_4$, with $H_2$ and $CO_2$ permeances increasing monotonically by 30-fold at the highest $O_3$ dose (FIG. 7A). The $H_2/CH_4$ and $CO_2/CH_4$ selectivities (9.7-19.9 and 6.1-16.5, respectively), were much higher than the corresponding Knudsen selectivities (2.8 and 0.6, respectively), confirming that the incorporated vacancy defects could indeed advantageously sieve similarly-sized molecules. Interestingly, the activation energy for $H_2$, $CO_2$, and $CH_4$, extracted by subtracting their heat of adsorption (2.7, 9.9, and 8.7 kJ/mole, respectively) from the observed apparent activation energy, did not change significantly (FIG. 7B). The decrease in selectivity at higher dosage can be attributed to the coalescence of adjacent pores, which is expected to promote the effusive transport.

Hindering the etching reactor with the synchronized Ar purge ($t_d=0$-$1.0$ s) (10 bar) improved the $CO_2$-sieving performance (FIG. 7C) $CO_2$ permeance of 2'620 GPU with corresponding $CO_2/N_2$ and $CO_2/CH_4$ selectivities of 27.6 and 20.0 could be achieved at $O_3$ dose of $1.6\times10^{17}$ molecules $cm^{-3}$ s ($\tau=0.1$ s, $t_d=0.5$ s), proving that the collection of nanopores observed by Ac-HRTEM is indeed attractive for $CO_2$-sieving. The rapid removal of residual $O_3$ by the Ar purge was also reflected in the fact that a relatively lower structural disorder was observed by the Raman spectroscopy. The use of purge improved $CO_2/CH_4$ selectivity without a significant loss in $CO_2$ permeance (FIG. 7C). The sieving of $CO_2$ from $N_2$ corresponds to a MSR of 0.3 Å and a $CO_2/O_2$ selectivity of 12.6 could be achieved which corresponds to a MSR of 0.2 Å.

Figure 10:
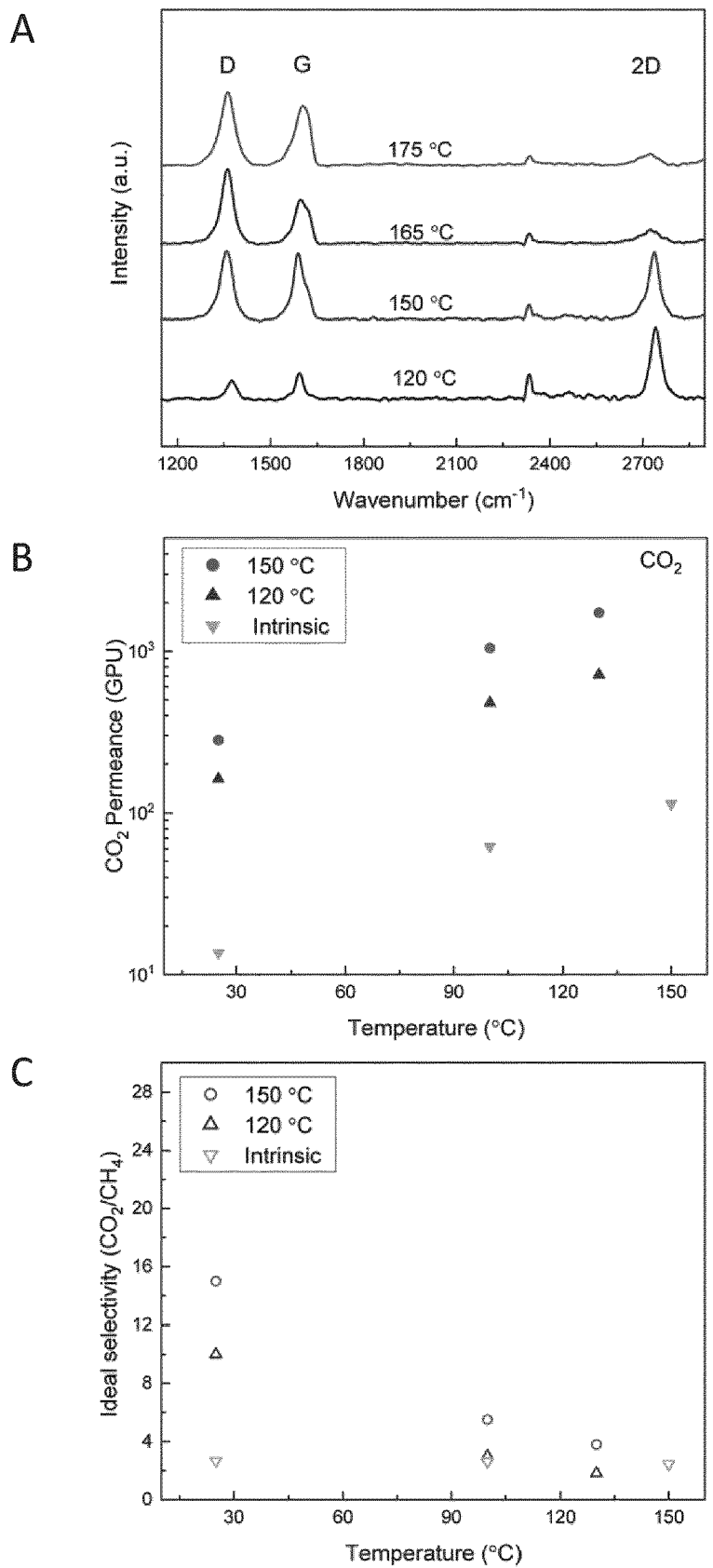
FIG. 10 provides Raman spectra of N-SLG etched by MGR at 120-175° C. revealing increasing defect density at a function of temperature (A). $CO_2$ permeances (B) and corresponding $CO_2/CH_4$ selectivities (C) from N-SLG prepared by MGR at 120 and 150° C. MGR was carried out with τ of 0.2 s and $P_{up}$ of 1 bar.

The etching kinetics could be controlled to yield attractive $CO_2/CH_4$ selectivities at a wide range of reactor temperatures (i.e. 120-290° C.) with optimized $O_3$ dosages (FIGS. 7D & 10). For a given ozone dose ($\tau$=0.1 s, $t_d$=0.5 s), increasing gas permeance and decreasing selectivity was observed as a function of the etching temperature, attributing to a faster etching kinetics at the higher temperature. This was evidenced in HRTEM-derived PSD where the mean pore size (edge to edge gap) increased by ca. 0.2 nm at 290° C. (FIG. 7E). The mean pore size at 290° C. could be reduced by optimizing the $O_3$ dose by reducing $t_d$ from 0.5 to 0.2 s and using a pressurized He purge as purge system. This was reflected in the improvements in the $H_2/N_2$ and $CO_2/N_2$ selectivities (FIG. 7D).

The method of the invention has a unique advantage that one can adjust the molecular cut-off for a specific molecular-sieving application.

This is further supported by expanding vacancy defects using $O_2$ at 200° C. in-situ. Briefly, the feed side of the ozone treated graphene membrane of the invention was pressurized with $CO_2/N_2$ mixture while the permeate side was swept with Ar, and a steady-state operation was achieved. To initiate the etching, the sweep gas was switched to $O_2$. Subsequently, the partial pressure of $CO_2$ and $N_2$ in the permeate side was tracked as a function of time using an online mass spectrometer. After the reactor, the sweep was switched back to Ar to measure the state-state permeation data.

Figure 8:
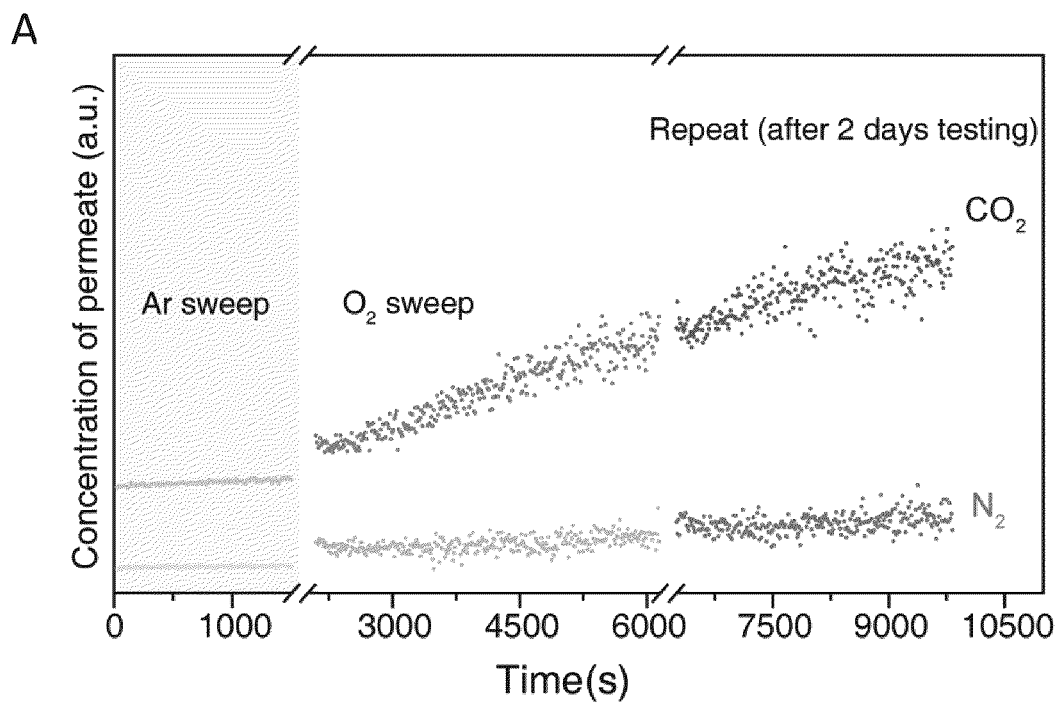
FIG. 8 provides a characterization of the gas separation performance of graphene membranes of the invention treated with increasing dosage of $O_3$ according to a method of the invention comparted to a slow $O_2$ etching at 200° C. A: $CO_2$ and $N_2$ evolution in the permeate side during the in-situ etching of graphene membrane with $O_2$; B: Gas permeance as a function of kinetic diameter and (C) corresponding gas pair selectivities before and after etching with $O_2$. The repeat refers to repeating the etching of graphene membranes after several days of gas permeance testing; D: apparent activation energy of the graphene membrane before and after 1 h oxygen etching; E: comparison of the $CO_2/N_2$ mixture separation performance of graphene membranes of the invention with that from the state-of-the-art membranes. The target area refers to membrane performance needed to surpass the energy-efficiency of amine-based absorption process.
Figure 8:
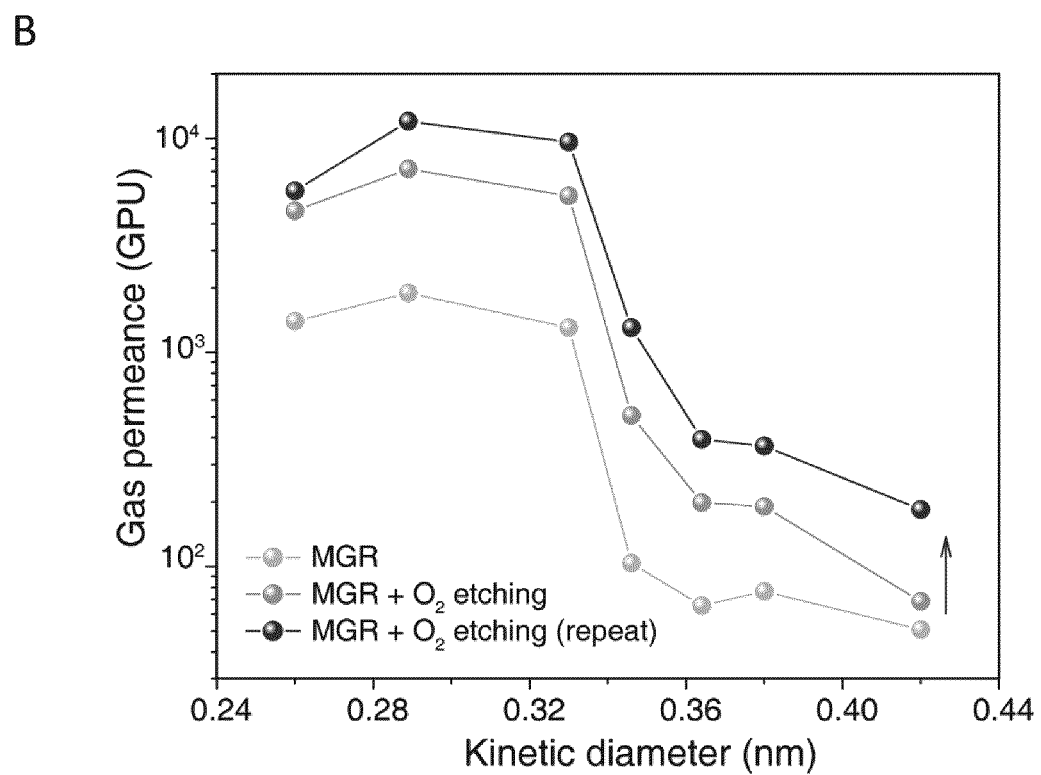
Figure 8:
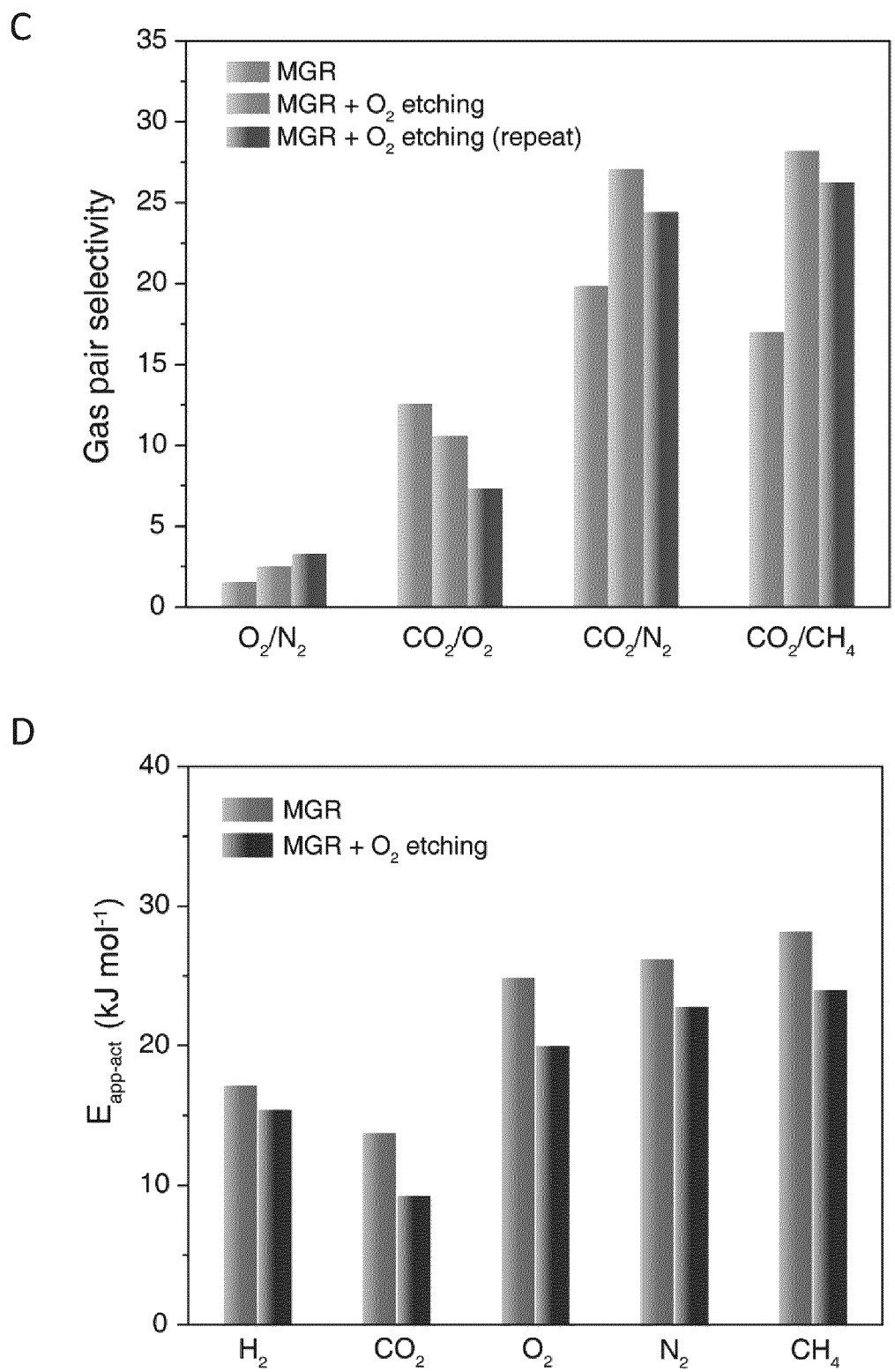
Figure 8:
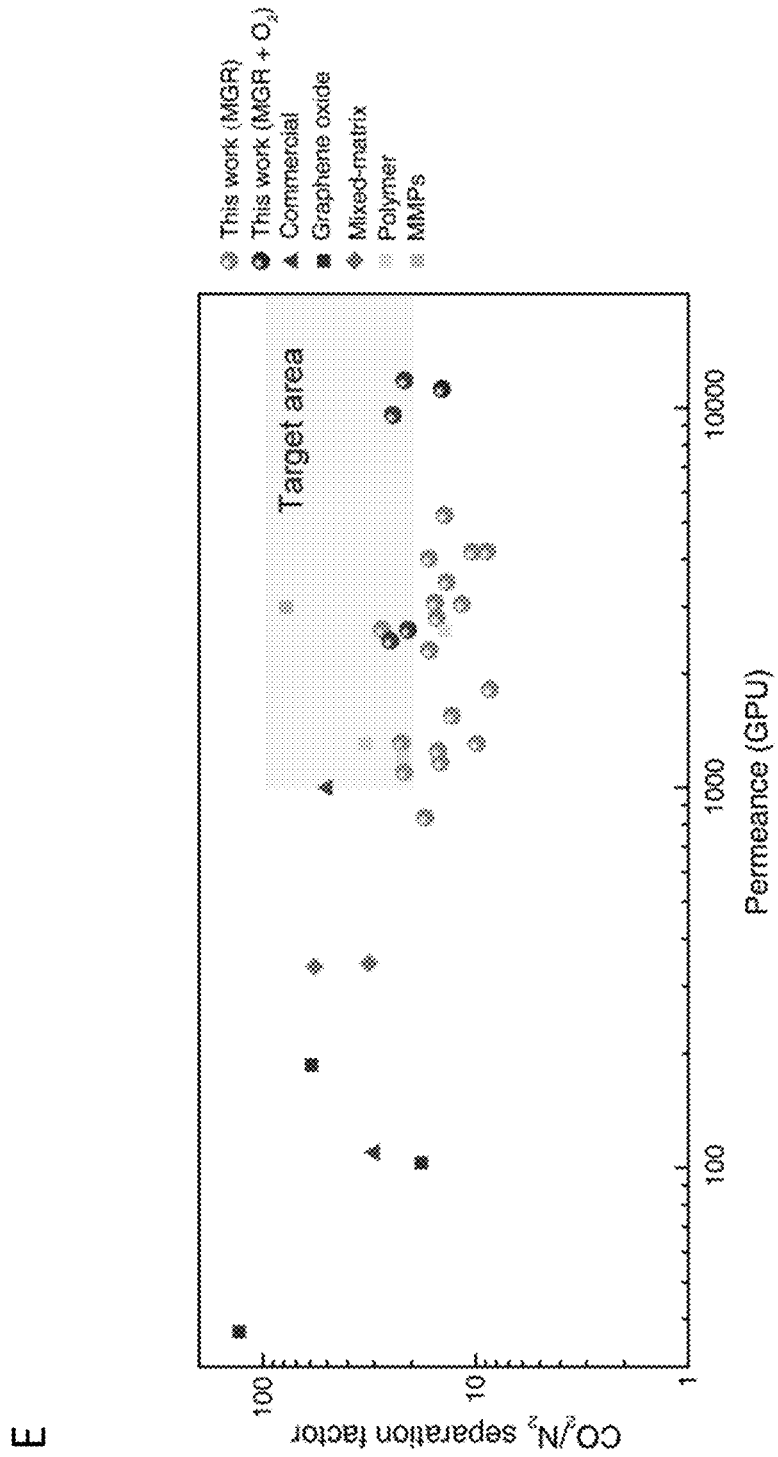

Upon $O_2$ exposure at 200° C., $CO_2$ and $N_2$ concentrations in the permeate side increased as a function of time (FIG. 8A). However, the increase in the $CO_2$ concentration was much more rapid which resulted in the improvement of $CO_2$ permeance as well as $CO_2/N_2$ selectivity (FIGS. 8B & C). The improvement in the performance was permanent and could be observed after several cycles of testing over several days. Repeating $O_2$-based pore expansion, on the same graphene membrane after several days, led to further improvement in $CO_2/N_2$ selectivity (FIGS. 8A & C). The pore expansion was confirmed by the reduced apparent activation energy of all gas molecules (2 kJ mol$^{-1}$ for $H_2$, and 4 kJ mol$^{-1}$ for other gases, FIG. 8D).

Figure 9:
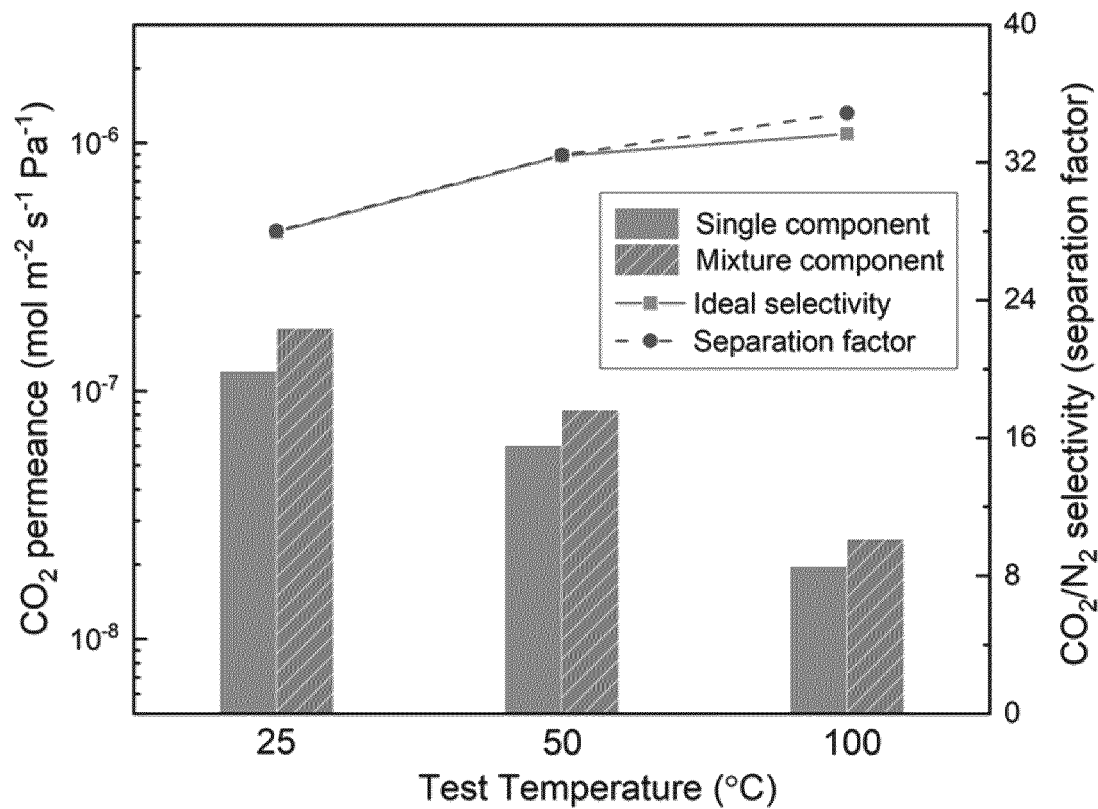
FIG. 9 provides comparison of gas separation performance of graphene membranes of the invention performance with single-component and mixed-gas (20% $CO_2$, 80% $N_2$) feeds at various temperatures as described under Example 3.

The slow pore expansion with $O_2$ could shift the molecular cutoff by ca. 0.1 Å, consistent with etching kinetics of graphite with $O_2$ at 200° C. Assuming first-order kinetics with $O_2$, an etching rate constant of 1.6×10$^{-7}$ nm min$^{-1}$ Torr$^{-1}$ was estimated at these conditions (Chu et al., 1992, Surf Sci. 268, 325-332; Tracz et al., 2003, Langmuir. 19, 6807-6812; Yang et al., 1981, J. Chem. Phys. 75, 4471-4476). As a result, the pore expansion for 1-2 h favored $O_2$ permeation, reducing $CO_2/O_2$ selectivity from 12.6 to 7.4, and increasing $O_2/N_2$ selectivity from 1.6 to 3.4 (FIG. 8C). Combined with $O_2$ permeance of 1'300 GPU, it makes gas selective separation filters of the invention attractive for the decentralized small-scale applications such as hospitals where $O_2/N_2$ separation is needed for enriching $O_2$. In the context of post-combustion capture, the shifted cutoff allowed us to realize extremely attractive $CO_2/N_2$ separation performance with $CO_2$ permeance and $CO_2/N_2$ selectivity of 9'600 GPU and 24.4, respectively (FIG. 8E). Another membrane treated by MGR (250° C., 1.6×10$^{17}$ molecules cm$^{-3}$ s ($\tau$=0.1 s, $t_d$=0.5 s Ar)) yielded $CO_2$ permeance of 11'850 GPU and $CO_2/N_2$ selectivity of 21.7 after 1 h $O_2$ treatment. The $CO_2/N_2$ separation performance was similar to that from the single component with the mixture separation factor slightly higher than the corresponding ideal selectivity (FIG. 9), which can be attributed to competitive adsorption of $CO_2$ over $N_2$.

Overall, those data support that a method of the invention allows the controlled incorporation of vacancy-defects in graphene membrane by limiting the $O_3$ exposure time to few milliseconds. The PSD in graphene can be tuned by the $O_3$ dose and by a slow expansion in $O_2$ atmosphere after ozone treatment (The graphene membrane treated by MGR was exposed to 200° C. $O_2$ atmosphere for 1-2 h to conduct in-situ etching in the membrane module). MSR of 0.2 Å was achieved with attractive $CO_2/CH_4$, $CO_2/N_2$, $O_2/N_2$ separation performances with $CO_2/O_2$ and $CO_2/N_2$ selectivities up to 12.6 and 27.5, respectively. The porosity in the reported membranes is only ca. 1%, and yet, attributing to the ultrashort diffusion path, extremely large gas permeances were realized, indicating that there is a large potential in further improving the gas permeance by increasing the porosity.

A slow expansion of vacancy-defects with oxygen exposure at 200° C. could shift the molecular cutoff by 0.1 Å. Resulting $O_2/N_2$ selectivity of 3.4 with corresponding $O_2$ permeance of 1'300 gas permeation units (GPU), and $CO_2/N_2$ selectivity of 21.7 with corresponding $CO_2$ permeance of 11'850 GPU, make gas filter membranes of the invention attractive for energy-efficient decentralized air separation and post-combustion carbon capture.

Example 4—Å-Scale Control of Pore-Size-Distribution by a Method of the Invention Using a Plurality of Micro-Pulse of $O_3$ at High Pressure A custom millisecond gasification reactor (MGR) as described above was used to expose as-synthesized single-layer graphene using chemical vapor deposition (CVD) on a copper foil, to a limited dose of $O_3$, i.e., with a time resolution of few milliseconds in the pressure range of 0-760 torr and temperature range of 120-290° C. Briefly, the exposure time and the pressure were controlled by two synchronized millisecond leak valves (MLVs) responsible for introducing and purging $O_3$.

Figure 11:
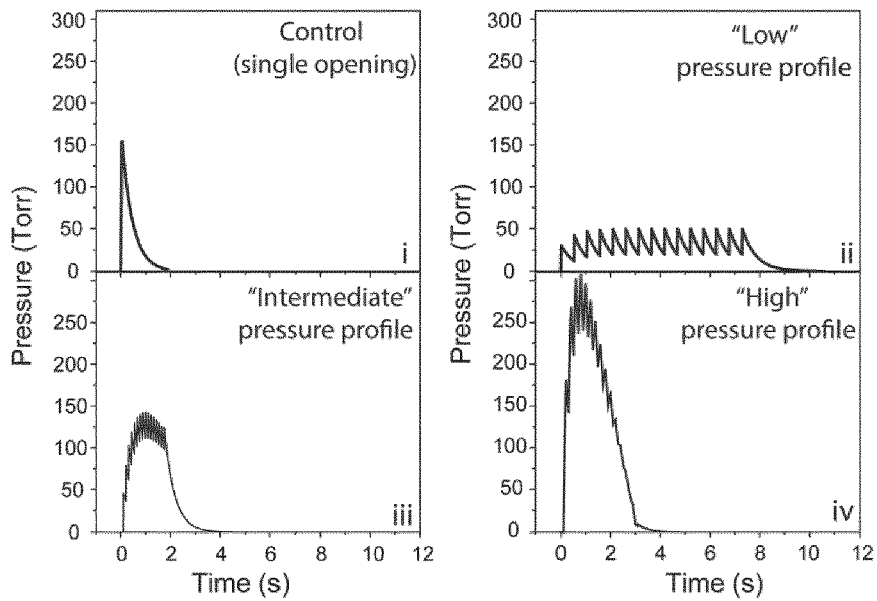
FIG. 11 discusses predictable etching of A-scale vacancy defects in SLG. Four cases of simulated total pressure profiles of the ozone source (ozone source contains 9 mol % in $O_3$) used for etching SLG (A), and the corresponding simulated PSD (B). (C) Ac-HRTEM images showing the representative vacancy defects of "intermediate". (D) PSD derived from the Ac-HRTEM images of N-SLG etched using the "intermediate" pressure profile, which is then compared to the simulated PSD from the mathematical model (E).
Figure 11:
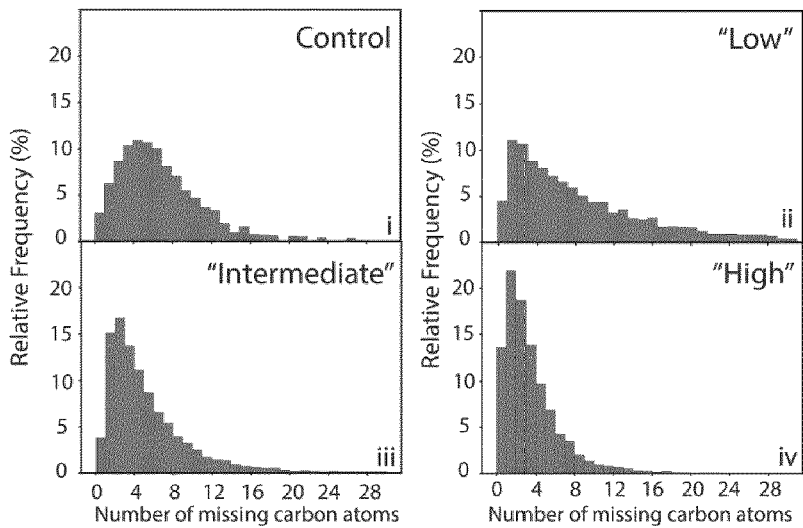
Figure 11:
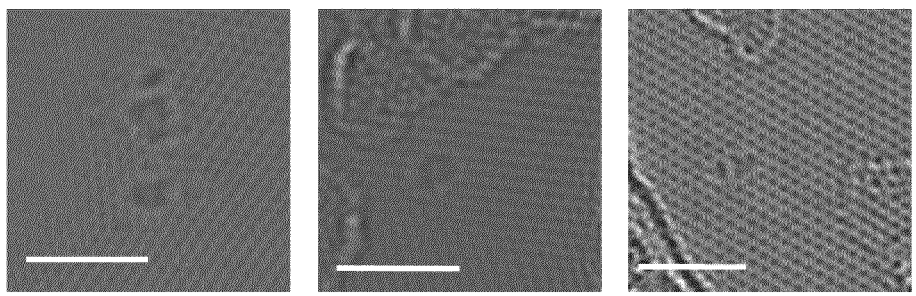
Figure 11:
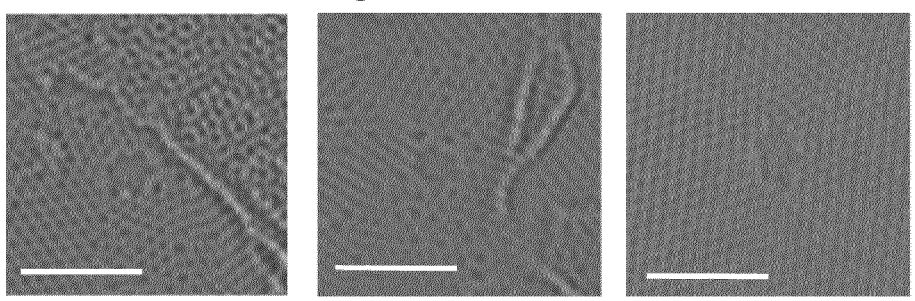
Figure 11:
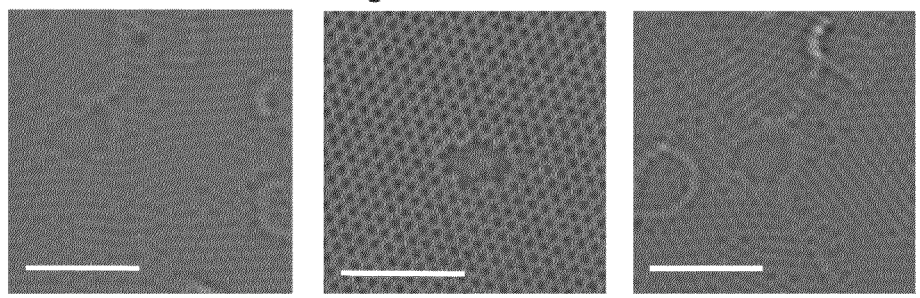
Figure 11:
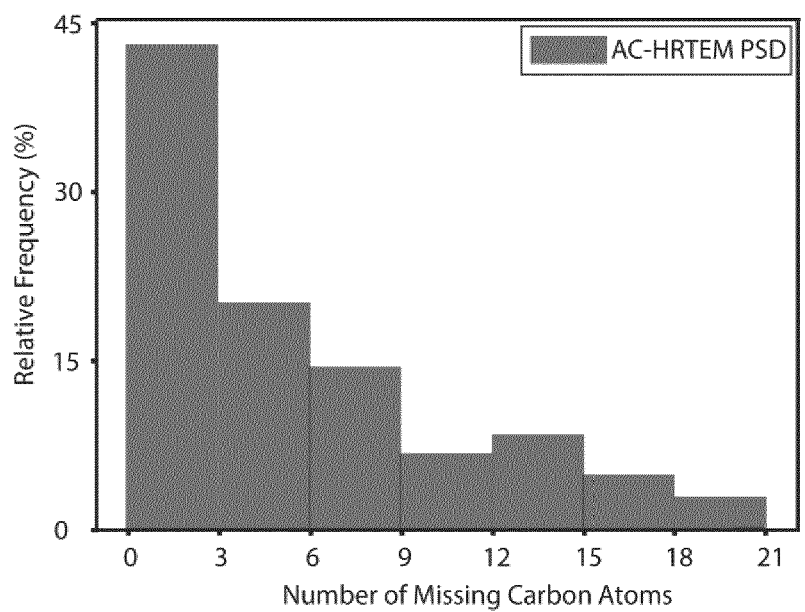
Figure 11:
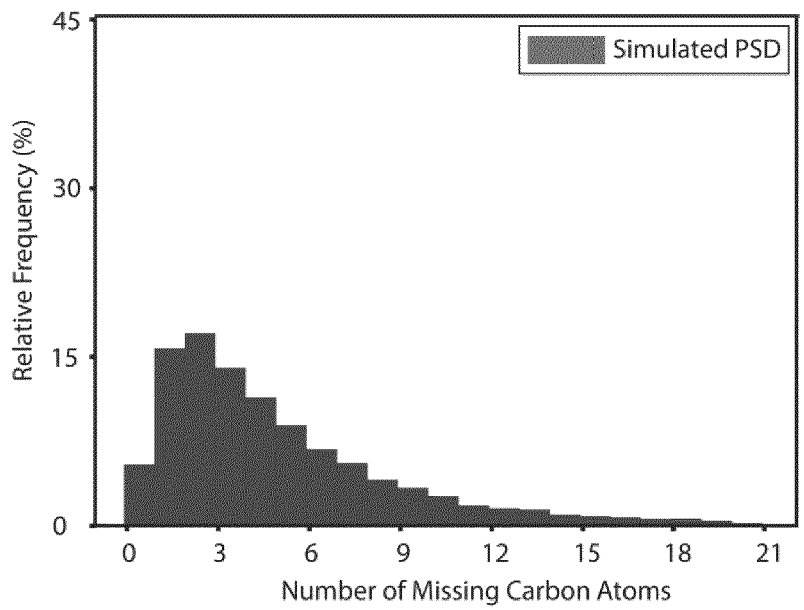

The advantage of using a plurality of micro-pulse over the use of a single pulse is that the pressure profile is not fixed by the conductance of the two MLVs controlling the gas flow in the reactor as in the case of the single pulse. Indeed, $O_3$ delivery via a plurality of transient pulses allows one to explore several pressure profiles as a function of the MLV opening time ($\tau_o$), the time interval between two consecutive pulses ($\tau_i$), and the number of pulses (F) (FIG. 11A). Specifically, compared to single-pulse condition ($\tau_o$=100 ms), the "low" was based on shorter $\tau_o$ and longer $\tau_i$ ($\tau_o$=10 ms, $\tau_i$=500 ms, and F=15) to maintain the lower and flat pressure profile. In contrast, the "intermediate" ($\tau_o$=10 ms, and F=15) and "high" ($\tau_o$=100 ms, and F=15) were used shorter $\tau_i$ (100 ms) to achieve a sharper pressure profile.

Indeed, compared to the case of a single pulse (control experiment, panels i in FIGS. 11A and B), further narrower PSDs could be achieved with the two rectangular-shaped pulse pressure profiles called as "intermediate" and "high" based on the peak pressure (panels iii and iv in FIGS. 11A and B). The "low" pressure profile led to a PSD with a long tail (panels ii in FIGS. 11A and B).

The following mathematical model for predicting the PSD was established as follows.

The reaction of $O_3$ with graphene proceeds as follows: an $O_3$ molecule chemisorbs on to graphene yielding an epoxy group on the lattice. The epoxy groups are highly mobile, even at room temperature, attributing to low energy barrier for diffusion (~0.73 eV), and subsequently diffuses around to form energy-minimizing epoxy clusters, eventually evolving into ether chains. The strain present in the chain ultimately leads to C—C bond cleavage (nucleation event). Therefore, the nucleation rate is proportional to the population of the epoxy groups, and consequently, proportional to the $O_3$ pressure, P (Equation 2). In the case of expansion of pre-existing nanopore, $O_3$ molecules can directly attach to the nanopore edge. Pore expansion proceeds by the release of CO and $CO_2$ from the lattice with an energy barrier of ~1.1 eV. In this case, the expansion rate is proportional to $P^n$ where n<1 (Equation 3). Later, we show that a value of 0.5 for n predicts the experimentally-observed PSD reasonably well.

$$\frac{d\theta}{dt} = k_\theta P \quad (2)$$

$$\frac{dC}{dt} = k_e P^n \quad (3)$$

where $\theta$ is nucleation density, C is the number of missing carbon atoms, t is time, and $k_\theta$ and $k_e$ are rate constants for pore nucleation and expansion, respectively.

Equations 2 and 3 indicate that the $O_3$ pressure profile in the reactor would play an important role in determining the PSD. They also indicate that pore nucleation, compared to pore expansion, is a stronger function of P and will be relatively promoted at a higher P. On the other hand, since the energy barriers for pore nucleation and expansion are comparable, the reaction temperature is not an optimal parameter for the relative tuning of the kinetics of nucleation versus that of expansion. In fact, increasing the temperature will increase the rates of both events. Given the P dependency, the pressure profile is expected to play a stronger role than temperature. Inspired by this insight, several pressure profiles have been screened to arrive at a narrow PSD.

The robustness of the mathematical model for predicting the PSD was verified by imaging nanopores using the aberration-corrected high-resolution transmission electron microscopy (Ac-HRTEM) (FIGS. 11c and d). Briefly, a home-made lacey carbon support was used to prepare N-SLG specimen for microscopy. The specimens were annealed in a reducing atmosphere at 900° C. to remove transfer-related contaminants where oxygen functional groups at the pore edge are also lost. Images were acquired at the conditions that neither nucleate nor significantly expand the nanopores. The number of missing carbon atoms in the nanopores imaged by Ac-HRTEM was approximated using a graphical approach. The graphical approach consisting of the following steps: i) the contour of the pore was manually drawn; ii) the outline of the pore was overlapped on top of a pristine graphene lattice (in a random position) maintaining the same scale to match the Ac-HRTEM image; iii) all the carbon atoms that fell inside of the vacancy defect were deleted and ImageJ software was used to count the number of missing C atoms (only C atoms that were utterly removed were counted as missing C atoms). We note that this number of missing carbon atoms $C_{mismatch}$ is an overestimation of the real number as the contour (edge of the nanopore) and the pristine lattice are not in a perfect match attributing to the lattice distortion present in the image. The error generated by the inherent mismatch between contour and digital graphene lattice of the proposed graphical approach is a function of the length of the contour line and geometric factors (such as the relative size of the dots representing the carbon atoms and the thickness of the contour line used, and the degree of mismatch between contour and digital lattice). To minimize the error, a correction factor ($C_{correction}$) that takes into account the number of carbon atoms that form the contour of the vacancy defect and geometric factors (to some degree) was developed.

$$C_{correction} \partial GC_{countour} \quad (4)$$

where $C_{contour}$ is the number of carbon atoms that form the contour of the vacancy defect and can be extracted by measuring the length of the contour and dividing by the distance between carbon atoms in a graphene lattice (0.142 nm) and G is a geometric correction factor.

The estimated number of missing carbon atoms ($C_{missing}$) was calculated using the following equation:

$$C_{missing} = C_{mismatch} - GC_{contour} \quad (5)$$

The geometric correction factor for our system was calculated by simulating 10 pores of a known structure (i.e., known number of missing carbon atoms and number of carbon atoms in the contour), analyzing them using the geometric approach, and minimizing the error between the real number of carbon missing atoms and $C_{missing}$. The calculated geometric factor was 2.5. The calculated number of missing carbon atoms using the graphical approach for the P-22 shown in was 21 which corresponds to an error of 5%.

The validity of the graphical approach was verified by analyzing four vacancy defects with three different mismatch angles each of them. The analyzed vacancy defects were P-6, P-13, P-22, and P-65 (containing 6, 13, 22, and 65 missing carbon atoms, respectively). The calculated number of missing carbon atoms by the graphical approach was in good agreement with the real number of missing carbon atoms (the observed errors were ≤10%).

An alternative approach to analyzing the vacancy defects is to precisely draw the graphene lattice around them and count the number of missing carbon atoms. However, this type of analysis is time-consuming and is restricted to vacancy defects where the lattice is completely resolved around them. Overall, the graphical approach is a powerful tool to meaningful calculate the PSD of nanoporous graphene samples. It allows the analysis of a vast number of pores because the lattice does not have to be resolved entirely around the pore.

The representative nanopores from the "intermediate" case are shown in FIG. 11c. More than 150 nanopores were analyzed to obtain the PSD and the pore density. The extracted PSD matches well with the above model-predicted PSD (FIGS. 11d and 1e). The density of vacancy defects extracted from the image analysis ($5.7 \times 10^{12}$ cm$^{-2}$) is similar to that predicted by the model ($5.3 \times 10^{12}$ cm$^{-2}$), confirming the robustness of the model in predicting the PSD from multi-pulse millisecond gasification. The bin size for the Ac-HRTEM image is three carbon atoms because of the uncertainty (1-3 carbon atoms) in determining the exact number of missing carbon atoms in several cases attributing to the limited image resolution.

To understand the separation performance of narrower PSDs achieved in this study, membranes were prepared by mechanically-reinforcing N-SLG with a thin film of poly[1-

(trimethylsilyl)-1-propyne (PTMSP) followed by the wet-transfer of the polymer-reinforced film to a porous tungsten support hosting an array of 5-μm holes. For comparison, a standalone 250±10 nm thick PTMSP membrane without the N-SLG film, yielded $CO_2$ permeance of 33'290±7'140 GPU and a $CO_2/N_2$ separation factor of 10.7±0.1, consistent with the earlier reports.

Based on the model, the density of the vacancy defects for the control (single pulse case (with 0-13.5 torr of ozone), "low", "intermediate", and "high" pressure profiles were $1.8 \times 10^{12}$, $7.2 \times 10^{12}$, $5.3 \times 10^{12}$, and $1.3 \times 10^{13}$ pores per square cm (cm), respectively. Out of the ensemble of nanopores, only nanopores that are made of 13 missing carbon atoms (P-13) or are larger than P-13, will have a large enough electron-density-gap to allow $CO_2$ transport with a reasonably-low energy barrier, especially considering that the $O_3$-etched nanopores are oxygen-functionalized.

Therefore, P-13 or larger nanopores will determine the $CO_2$ permeance. In fact, among all PSD, the "low" profile leads to the highest density of $CO_2$-permeable nanopores ($1.8 \times 10^{12}$ cm$^{-2}$), and yields the highest $CO_2$ permeance (25'530 GPU). In the two other cases ("intermediate" and "high"), the density of $CO_2$-permeable pores is lower ($3.8 \times 10^{11}$ and $2.9 \times 10^{11}$ cm$^{-2}$, respectively) and similar to the single pulse condition ($1.9 \times 10^{11}$ cm$^{-2}$) and as a result, $CO_2$ permeances are lower (3'170 and 4'400±2'070 GPU, respectively, despite having overall higher defect densities. "Intermediate" and "high" also have similar $CO_2$ permeance to control single (4'870±1600 GPU). However, interestingly, they show a higher $CO_2/N_2$ selectivity due to a narrow PSD.

The $CO_2/N_2$ selectivity is determined by the population of the nanopores which allow $CO_2$ transport relative to that of the larger nanopores which also allow $N_2$ transport. The PSD obtained by the "low" pressure profile did not lead to substantial improvement in the separation factor (12.5±0.5) compared to standalone PTMSP. This is due to the presence of a substantial number of nanopores larger than those missing 16 carbon atoms (P-16) that are known to allow $N_2$ transport with a reasonably-low energy barrier. In contrast, both "high" and "intermediate" pressure profiles led to much-improved separation factors (33.4±7.9, 18.6±0.8, respectively), with the highest separation factor being 39.8. This is significantly higher compared to that from the PTMSP (10.7±0.1) and also further higher than that resulting from a method of the invention with a transient pulse being a single-pulse (15.0±0.5), demonstrating the attractiveness of a multi-micro-pulse millisecond etching according to one aspect of the invention. In summary, high-performance post-combustion carbon capture membranes ($CO_2$ permeance 4'400±2070 GPU and a corresponding $CO_2/N_2$ selectivity of 33.4±7.9) could be achieved.

LIST OF ELEMENTS REFERENCED IN THE FIGURES

Millisecond gasification system 50
  support for single-layer graphene 3
  reactor chamber 4
    reaction chamber inlet 6
    reaction chamber outlet 8
  reactor chamber heating system 51
    heating means 18
    temperature controller 19
    temperature sensor 20
  ozone delivery system 52
    ozone source
    buffer reservoir tank 10
    pressure regulator 13
    ozone generator 14
    millisecond leak valve 9 (MLV-1)
  reactor chamber atmosphere controlling system 53
    control gas sources 61a, 61b
    control gas line 54
    control gas flow controller 15
  gas purge system 55
    purge gas source 65
    vacuum generation system 56
      vacuum pump 16
      vacuum control valve 17
      pressure transducer 63
    millisecond leak valve 12 (MLV-2)
  multi entry port valve 59
    ozone inlet 5
    purge gas inlet 57
    control gas inlet 7

The invention claimed is:

1. A method for the preparation of a gas selective separation filter comprising the steps of:
   a) providing a graphene membrane on a sacrificial support layer;
   b) subjecting said graphene membrane to one or more transient ozone gas pulses at a reactor temperature between 120 to 300° C.;
   c) purging ozone from the reactor chamber during or right after the transient pressurized ozone gas pulse; and
   d) cooling down the ozone treated graphene membrane to room temperature, wherein each transient ozone gas pulse lasts for 0.01 to 0.3 second.

2. The method according to claim 1, wherein the transient ozone gas pulse is provided into the reactor chamber at a peak pressure of 3 to 27 Torr ($3.9 \times 10^{-3}$ to 36 mbars) from an ozone source.

3. The method according to claim 1, wherein the transient ozone gas pulse is subjected to the graphene membrane such that the graphene etching time is kept below 1 s.

4. The method according to claim 1, wherein the reactor temperature under step b) is between 150 to 300° C.

5. The method according to claim 1, wherein the transient ozone gas pulse contains a $O_3$ dose of $3.0 \times 10^{16}$ to $3.5 \times 10^{17}$ molecules cm$^{-3}$ s.

6. The method according to claim 1, wherein a plurality of transient ozone gas pulses, each lasting 100 ms or less are generated over a duration of 0.5 to 4 seconds.

7. The method according to claim 6, wherein said plurality of ozone gas pulses comprises 10 to 20 pulses.

8. The method according to claim 1, wherein the ozone is purged from the reactor chamber after the last transient ozone gas pulse through a vacuum purge system.

9. The method according to claim 1, wherein the ozone is purged from the reactor chamber after the last transient ozone gas pulse by an inert gas purge flow connected to the vacuum purge system.

10. The method according to claim 9, wherein the inert gas purge lasts for 1 to 10 seconds.

11. The method according to claim 1, wherein the ozone is provided from an source comprises a buffer reservoir tank containing a mixture of $O_2$ and $O_3$ at a pressure of 1 and 5 bars, wherein the $O_3$ molar content is 9%.

12. The method according to claim 1, wherein the ozone treated graphene membrane is cooled down within the reactor chamber under Ar atmosphere.

13. The method according to claim 6, wherein a plurality of transient ozone gas pulses, each lasting 100 ms or less are generated over a duration of 1 to 3 seconds.

* * * * *